(12) United States Patent
Diem et al.

(10) Patent No.: US 8,428,320 B2
(45) Date of Patent: Apr. 23, 2013

(54) METHOD OF RECONSTITUTING CELLULAR SPECTRA USEFUL FOR DETECTING CELLULAR DISORDERS

(75) Inventors: Max Diem, Boston, MA (US); Milos Miljkovic, Jamaica Plain, MA (US); Melissa Romeo, Jamaica Plain, MA (US); Benjamin Bird, Jamaica Plain, MA (US); Jennifer Schubert, Boston, MA (US); Kostas Papamarkakis, Springfield, MA (US)

(73) Assignee: Northeastern University, Boston, MA (US)

( * ) Notice: Subject to any disclaimer, the term of this patent is extended or adjusted under 35 U.S.C. 154(b) by 190 days.

(21) Appl. No.: 12/994,647

(22) PCT Filed: May 29, 2009

(86) PCT No.: PCT/US2009/045681
§ 371 (c)(1),
(2), (4) Date: Feb. 17, 2011

(87) PCT Pub. No.: WO2009/146425
PCT Pub. Date: Dec. 3, 2009

(65) Prior Publication Data
US 2011/0142324 A1    Jun. 16, 2011

Related U.S. Application Data

(60) Provisional application No. 61/056,955, filed on May 29, 2008.

(51) Int. Cl.
*G06K 9/00* (2006.01)

(52) U.S. Cl.
USPC .................................................. 382/128

(58) Field of Classification Search .......... 382/128–134; 128/920–925; 356/39–49; 600/407–414, 600/424–426; 345/581–618
See application file for complete search history.

(56) References Cited

U.S. PATENT DOCUMENTS 5,991,028 A    11/1999    Cabib et al.

OTHER PUBLICATIONS

Angeletti, C. et al., "Detection of malignancy in cytology specimens using spectral-spatial analysis," Lab. Investigation: A Journal of Technical Methods and Pathology, vol. 85(12): 1555-1564 (Dec. 2005).
Doane, D., et al., "Automatic Diagnosis of Cervical Cells by Spectral Cytopathology," Gordon Censsis Student Presentations National Science Foundation Visit, Apr. 22, 2009 (1 page).
Levenson, R.M. et al., "Digital Spectral Imaging for Histopathology and Cytopathology," Proceedings of the SPIE—The International Society for Optical Engineering, SPIE, vol. 2983: 123-135 (May 1, 1997).
Romeo, M.J. et al., "Infrared and Raman Micro-spectroscopic Studies of Individual Human Cells," Vibrational Spectroscopy for Medical Diagnosis, 44 pp. (2008).

*Primary Examiner* — Atiba O Fitzpatrick
(74) *Attorney, Agent, or Firm* — Wilmer Cutler Pickering Hale & Dorr LLP.

(57) ABSTRACT

Embodiments of the present disclosure provides improved methods for determining the presence of abnormalities in exfoliated cells. In one embodiment, the present disclosure provides methods for reconstructing cellular spectrum of a cell sample by creating a spectral map of the cellular sample, generating a binary mask of the spectral map, removing edge artifacts from each cell, and co-adding spectral data of each pixel corresponding to the cell to reconstruct the spectrum of each cell.

18 Claims, 16 Drawing Sheets

US 8,428,320 B2

METHOD OF RECONSTITUTING CELLULAR SPECTRA USEFUL FOR DETECTING CELLULAR DISORDERS

CROSS-REFERENCE TO RELATED APPLICATIONS

This application is a National Entry Stage of PCT/US2009/45681, filed on May 29, 2009, which claims priority to U.S. Provisional Application Ser. No. 61/056,955, filed on May 29, 2008, all of which are herein incorporated by reference in its entirety.

FEDERALLY SPONSORED RESEARCH OR DEVELOPMENT

This invention was sponsored by National Cancer Institute of the NIH (Grant # CA 090346), and thus the U.S. government has certain rights in this application.

FIELD OF THE INVENTION

The present disclosure generally relates to spectral characterization of cells, and diagnosis of disease. More particularly, the disclosure relates to methods for reconstructing spectra of cells from data sets collected by spectral mapping or imaging. Such reconstructed spectra may be used for determining the distribution and location of normal and abnormal cells in a cell sample disposed on a substrate, and thus for diagnosing a benign disorder, a viral infection, a pre-disease or disease state.

BACKGROUND OF THE INVENTION

A number of diseases are presently diagnosed using classical cytopathology methods involving examination of nuclear and cellular morphology and staining patterns. Typically, this occurs by the examination of up to 10,000 cells in a sample and the finding of about 10 to about 50 cells that are abnormal. This finding is based on subjective interpretation of visual microscopic inspection of the cells in the sample.

An example of this diagnostic methodology is the Papanicolaou smear (Pap smear). Monitoring the onset of cervical disease by detecting premalignant and malignant cells using the Pap smear has greatly reduced the mortality rate due to cervical cancer. Nevertheless, the process of screening Pap smears is labor intensive and has changed little since it was first described by Papanicolaou almost 50 years ago. To perform the test, endo- and ectocervical exfoliated cells from a patient's cervix are first scraped using a brush and spatula or a cytology broom. Because cervical disease often originates from the cervical transformation zone, i.e., the border between the endocervix (covered by glandular or columnar epithelial cells) and the ectocervix (covered by stratified squamous epithelial cells), cells from this area are sampled by the exfoliation procedure. The scraping is then smeared, or otherwise deposited, on a slide, and the slide is stained with hematoxylin/eosin (H&E) or a "Pap stain" (which consists of H&E and several other counterstains), and microscopically examined. The microscopic examination is a tedious process, and requires a cytotechnologist to visually scrutinize all the fields within a slide to detect the often few aberrant cells in a specimen. This process can be analogized to looking for needles in haystacks where most haystacks contain few if any needles. Consequently, the detection of abnormal specimens depends on the level of a cytotechnologist's experience, quality of the smear preparation, and the work load. As a result of these concerns, attempts have been made both to automate the Pap screening process, and develop other objective alternatives. Recent developments in classical cytology have focused on preparing better cell deposits, eliminating clumps of cells, and confounding materials such as mucus, erythrocytes etc.

Other techniques focus on improving the diagnostic step, which relies on visual inspection by the cytologist. Automated image analysis systems have been introduced to aid cytologists in the visual inspection of cells. These methods aid in selecting cells that need further human inspection by eliminating the most "normal" cells from the cell population. However, these techniques are expensive, labor intensive, and do not aid in all desirable cell diagnoses.

Consequently, a need exists for improvements in diagnostic techniques. In particular, there remains a need for an improved system and method for data acquisition, inspection, and comparison of cytological cellular data.

SUMMARY

The present disclosure provides, in part, improved methods for determining the presence of abnormalities in cells long before such abnormalities can be diagnosed using classical cytopathological methods. Aspects of the present disclosure provide methods for reconstructing the spectrum of a cell sample by creating a spectral map/spectral image of the cellular sample, identifying pixels that correspond to a particular cell, co-adding spectral data of pixels corresponding to that cell to reconstruct the spectrum of that cell, and similarly reconstructing the spectral data of other cells in the sample. Improved methods for the early detection of disease use the underlying methodology.

In one aspect, the disclosure provides a method of generating a spectrum of a cell. The method comprises (a) receiving a plurality of spectral pixels, each of the spectral pixels corresponding to a portion of the cell, each of the spectral pixels being associated with a plurality of measurements, each of the measurements being associated with an intensity of light at a particular wavenumber, one of the measurements associated with each spectral pixel being a sorting measurement, the sorting measurement being associated with a wavenumber within a band of wavenumbers; (b) identifying a subset of the plurality of the spectral pixels, a first pixel being in the subset, the sorting measurement of the first pixel being greater than or equal to the sorting measurements of the other spectral pixels, other pixels in the plurality of spectral pixels being in the subset if they satisfy a first criteria, a spectral pixel satisfying the first criteria if that spectral pixel's sorting measurement is greater than a first threshold; and then (c) generating the spectrum, the spectrum having a plurality of reconstructed measurements, each of the reconstructed measurements corresponding to a particular wavenumber, each of the reconstructed measurements being formed according to a sum of the measurements associated with a particular wavenumber of all the pixels in the subset.

In some embodiments, the first threshold is a preselected percentage of the first pixel's sorting measurement. In certain embodiments, the band of wavenumbers has a lower end and an upper end, the lower and upper ends being user selectable values. In particular embodiments, the lower end is 1640 $cm^{-1}$ and the upper end is 1670 $cm^{-1}$.

In some embodiments, the sorting measurement for each spectral pixel is a peak value of that spectral pixel's associated measurements, the peak value being a peak that is closest to a user selectable wavenumber. In particular embodiments, the user selectable wavenumber is 1650 $cm^{-1}$. In certain embodiments, pixels in the plurality of spectral pixels are in the subset only if they satisfy both the first criteria and a second criteria, a pixel satisfying the second criteria if a difference between the wavenumber associated with the second pixel's sorting measurement and the wavenumber associated with the first pixel's sorting measurement is less than a second threshold. In some embodiments, the second threshold is a user selectable number. In certain embodiments, the user selectable number is 4 $cm^{-1}$.

In some embodiments, the measurements associated with each spectral pixel represent values derived from light intensity measurements.

In another aspect, the disclosure provides a method of analyzing the physiological state of a test cell. The method comprises (a) generating a spectrum of the test cell, as described in the aspect and embodiments above, and then (b) determining whether the reconstructed spectrum of the test call has a predetermined criterion, the predetermined criterion being indicative of the physiological state of the test cell.

In some embodiments, the predetermined criterion is generated from abnormal control epithelial cell spectra or from normal control epithelial cell spectra.

In certain embodiments, the epithelial cells in the test and control samples are endothelial, mesothelial, or urothelial cells.

The disclosure also presents a method of detecting an epithelial cell disorder in a test cell. The method comprises (a) generating a spectrum of a test cell, as described in the previous aspects, and then (b) determining whether the generated spectrum of the test call has a predetermined criterion, the predetermined criterion being indicative of the presence of a disorder in the test cell.

In some embodiments, the predetermined criterion is generated from abnormal control epithelial cell spectra. In certain embodiments, the epithelial cells in the test and control samples are endothelial, mesothelial or urothelial cells. The epithelial cell disorder may be a benign disorder, a viral disorder, or cancer in certain embodiments.

In yet another aspect, the disclosure provides a method analyzing a cell in a sample. The method comprises (a) generating a spectral image comprising a plurality of spectral pixels, each spectral pixel corresponding to a portion of the sample, each spectral pixel being associated with a plurality of intensity measurements, each intensity measurement representing an intensity of light at a particular wavenumber, one of the intensity measurements associated with each spectral pixel being an amide I measurement; (b) identifying a subset of the spectral pixels, one member of the subset being a max spectral pixel, the max spectral pixel being a spectral pixel corresponding to a cell and having an amide I measurement that is greater than or equal to the amide I measurement of other spectral pixels corresponding to the cell, another member of the subset being a first spectral pixel that satisfies a first criteria, a second criteria, and a third criteria, the first criteria being that the first spectral pixel corresponds to the cell, the second criteria being that the amide I intensity of the first spectral pixel is greater than a first threshold, the third criteria being that a difference between the wavenumber associated with the first spectral pixel's amide I measurement and the wavenumber associated with the max spectral pixel's amide I measurement is less than a second threshold; and (c) forming a reconstructed cellular spectrum, the reconstructed cellular spectrum having a plurality of reconstructed intensities, each of the reconstructed intensities corresponding to a particular wavenumber, each of the reconstructed intensities being formed according to a sum of the intensity measurements at a particular wavenumber of the pixels in the subset.

BRIEF DESCRIPTION OF DRAWINGS

The following figures are presented for the purpose of illustration only, and are not intended to be limiting.

FIG. 8 also shows cellular spectra for the photographed cells. The spectra were reconstructed using the method disclosed herein.

DETAILED DESCRIPTION

Figure 1:
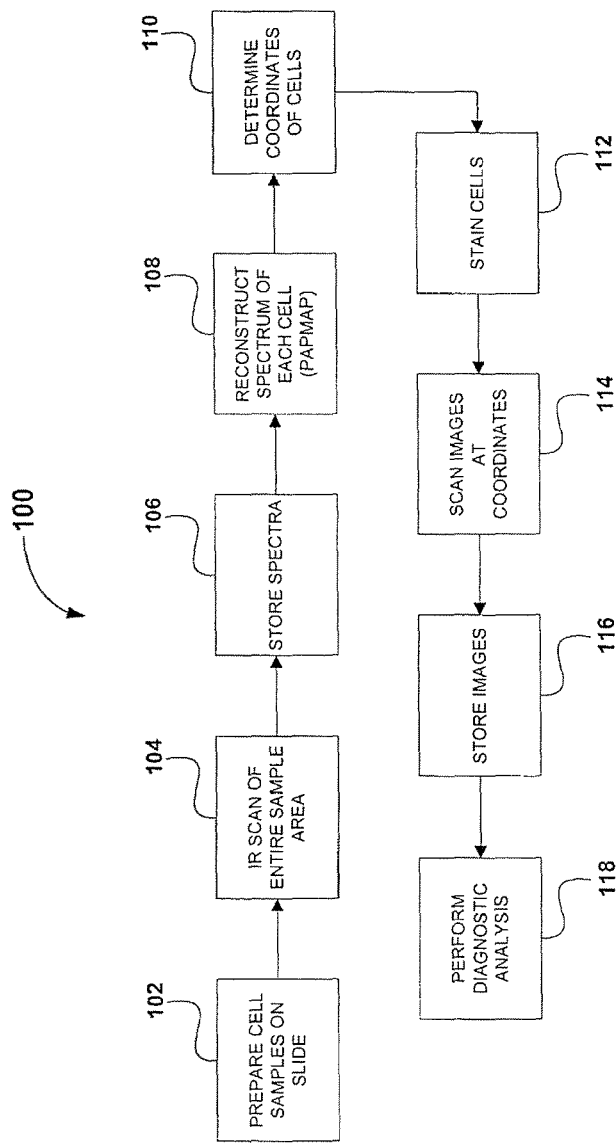
FIG. 1 is a flow diagram for an exemplary method for determining abnormalities in a cell sample in accordance with one aspect of the disclosure.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Improved methods of detecting abnormalities in cells are disclosed herein. As an example, the disclosed methods can detect abnormalities in cells that appear entirely normal under a traditional morphological analyses. Such cells if left untreated eventually develop morphological characteristics indicative of abnormality. The disclosed detection methods provide for much earlier detection of such abnormal cells, i.e., the cells can be detected as abnormal before such morphological changes occur. The detection of abnormality provided by the disclosed methods is also more reliable than that of traditional morphologically based methods.

One problem with morphologically based detection methods is that changes in cellular morphology characteristic of progressive disease are simply delayed responses to compositional disturbance of the disease. That is, cellular morphological changes are not the cause of disease; rather, they are a delayed reaction to the disease. Rather than detecting these delayed reactions to disease, the disclosed methods can detect cellular abnormalities before such delayed reactions even occur. Thus, the disclosed methods provide an early and reliable detection of cellular abnormalities.

Another problem with morphologically based detection methods is that they typically must be performed on stained cells. The stain makes morphological features more easily detectable by human observers. However, the presence of the stain also masks cellular characteristics that may themselves indicate abnormality. The disclosed methods can be performed on unstained cells. Thus, the disclosed methods are able to use more information that is directly representative of the cell in the detection of abnormalities.

The present disclosure provides diagnosis of cellular abnormalities potentially leading to disease by monitoring the biochemical changes associated with the disease that occur before morphological changes can be detected. These biochemical changes can be detected in all cells from a sample that later takes part in manifestations of disease. This novel methodology is based on reproducible physical measurements, mathematical algorithms, and associated changes in cellular mechanisms.

The present methodology, called Spectral Cytopathology, is a more sensitive and more reproducible technique for screening for disease in cell samples than is currently available and can be used to detect the progression of disease earlier than can classical cytopathology.

As used throughout the disclosure, the term "Spectral Cyto-Pathology" (SCP), unless otherwise indicated, shall mean the method of using a micro-spectrometer to obtain mid-infrared spectral data of multiple cells individually and to analyze the resulting spectra for determining the composition changes of the cells during the transition from a normal to a benign disorder, a virally infected or a pre-cancerous or cancerous state.

The term "test cell" refers to a cell sampled from in vivo or in vitro sources that is being analyzed or observed.

The term "abnormal" refers to cells that have a disorder which may result in a benign disorder, a viral disease, or cancer. Abnormal cells have spectra and criteria determined from spectra that are detectible different than "normal" cells. These abnormal cells may look morphologically normal or undiseased, but have the propensity of developing disorders. "Normal" cells do not have a disorder and can be used as controls. Normal cells can be sampled from subjects that do not have or that do not develop a disorder.

The term "exfoliated cells" refers to those cells scuffed off, removed, detached, or shed from a tissue surface by natural processes or by physical manipulation. Exemplary methods of collecting exfoliated cells include, but are not limited to, oral or bladder scraping (using a cervical spatula or brush), gynecological exam, filtration from urine, and the like.

The term "epithelial cell" encompasses all cells lining an organ including, but not limited to, endothelial cells, mesothelial cells, and urothelial cells, that may be squamous, columnar, or cuboidal.

The terms "squamous" "columnar," and "cuboidal" refer to types of epithelial cells that are simple or stratified, keratinized or unkeratinized, and/or ciliated or unciliated.

"Simple" squamous cells can be found lining blood vessels, lymph vessels, the mesothelium of body cavities, and the ascending thin limb of the kidney. "Stratified" squamous cells are found lining the hard palate, the dorsum of the tongue, the gingival, the esophagus, rectum, anus, skin, cervix, vagina, labia majora, orpaharynx, cornea, and the external urethra orifice.

"Simple" columnar cells can be found in the ducts on the submandibular glands, attached gingiva, ductuli, epididymis, vas deferens, seminal vesicle, larynx, trachea, nose, membranous urethra, penile urethra, the stomach, small and large intestine, rectum, gallbladder, ductal and lobular epithelium, fallopian tubes, uterus, endometrium, cervix, ejaculatory duct, bulbourethral glands, and prostrate. "Stratified columnar epithelial cells can be found in the ducts of the submandibur glands attached gingival, ductuli epididymis, vas deferens, seminal vesicle, larynx, trachea, nose, membranus urethra, and penile urethra.

"Simple" cuboidal cells can be found in thyroid follicles, ependyma, the ovaries, tubuli recti, rete testis, respiratory bronchioles, and the proximal and distal convoluted tubules of the kidney. "Stratified" cuboidal cells can be found in the sweat gland ducts.

The "physiological state" of cell refers to its general health, i.e., whether it is normal or abnormal, and to its propensity to develop abnormalities including morphological, biochemical, genetic, or other abnormalities, which can lead to cellular disorders.

A "predetermined criterion" is a value characteristic of normal cells or of abnormal cells.

FIG. 1 delineates a method for detecting abnormalities in a cytological cell sample. At step 102, cellular samples are collected and deposited on slides. The cellular samples can include, for example, exfoliated cells (e.g., endo- and ectocervical cells) collected from the cervical transformation zone, i.e., the border between the endocervix (covered by glandular or columnar epithelial cells) and the ectocervix (covered by stratified squamous epithelial cells). Liquid-based methods may be used to deposit cellular samples on a slide to provide evenly spaced and sparse deposits of cells, eliminate cellular debris and confounding cells, and maintain acceptable levels of cell population in a given field of view. Exemplary liquid-based methods for depositing cellular samples include, but are not limited to, cyto-centrifugation, the ThinPrep® method, the Surepath® methods, and the like. Exemplary slides for depositing cellular samples include, but are not limited to, infrared-reflective microscope slides (e.g., "Low-e"® slides).

At step 104, cellular samples deposited on slides are scanned to collect spectral data. For example, infrared spectral data of cellular samples can be collected using an infrared scanning device (e.g. infrared micro-spectrometer) at a preset aperture. The area over which data is collected is divided into pixels, and spectral data is collected at each pixel. For example, the spectral data of cellular samples can be collected from the entire sample area at a pixel size of about 6.25 μm×6.25 μm. The spectra data may include intensity values over a range of wavenumber values. The term "intensity" is used herein in accordance with its broad ordinary meaning, which includes measurements of absorbance, transmission, reflective absorbance intensity (transflectance), and the like.

At step 106, the collected spectral data of the cellular sample at each pixel is stored. At step 108, the spectrum of each cell is reconstructed by associating pixels with cells and co-adding the spectral data of pixels corresponding to a particular cell. Step 108 is described in detail below. Step 110 then determines the coordinates of cells in the sample area. At step 112, the cells are stained with at least one staining agent. Exemplary staining agents include, but are not limited to, hematoxylin/eosin (H&E), "Pap stain" (a mixture of H&E and other counterstains), and the like. At step 114, visual microscopic images ("photomicrographs") of all cells are acquired at coordinates determined in step 110. The images of all cells are stored at step 116. At step 118, scanned images from step 114 and reconstructed cellular spectrum from step 108 are correlated. This correlation step is used in the training phases of the algorithm, and typically consists of a cytologist or cyto-technician rendering a diagnosis of the cellular image. This diagnosis will be used to establish the correlation between classical cyto-pathology and the spectral results. The algorithm may use unsupervised multivariate statistics to investigate whether the dataset contains quantifiable differences or supervised discriminant algorithms that can classify cells based on the spectral data and correlations from standard cyto-pathology or cell biology, or supervised methods trained with cells of known cyto-pathology.

Figure 3:
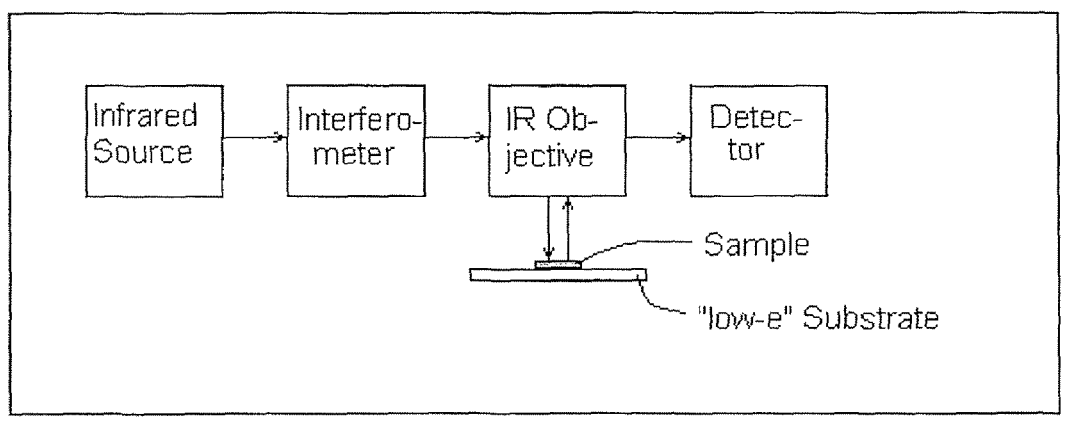
FIG. 3 is a schematic diagram of the instrumentation used for the observation of infrared spectra of cells.

FIG. 3 shows an example apparatus for measuring the infrared micro-spectra. Light emitted form an infrared source, generally a metallic or non-metallic solid heated electrically to between 1300° C. and 2000° C., is modulated by an interferometer before being focused onto the sample by an infrared objective. In this example, the infrared light passes through the sample, is reflected by the silver layer of the "low-e" slide, passes through the sample again, and is detected and converted to an electric signal by a suitable infrared detector. This method of measuring infrared spectra by a double pass transmission/reflection is referred to as "transflection." The ratio of incident to "transflected" light intensity is converted to "optical density" or "absorbance" units, and is henceforth referred to as "absorbance," "absorption intensity" or simply as "intensity."

Figure 2:
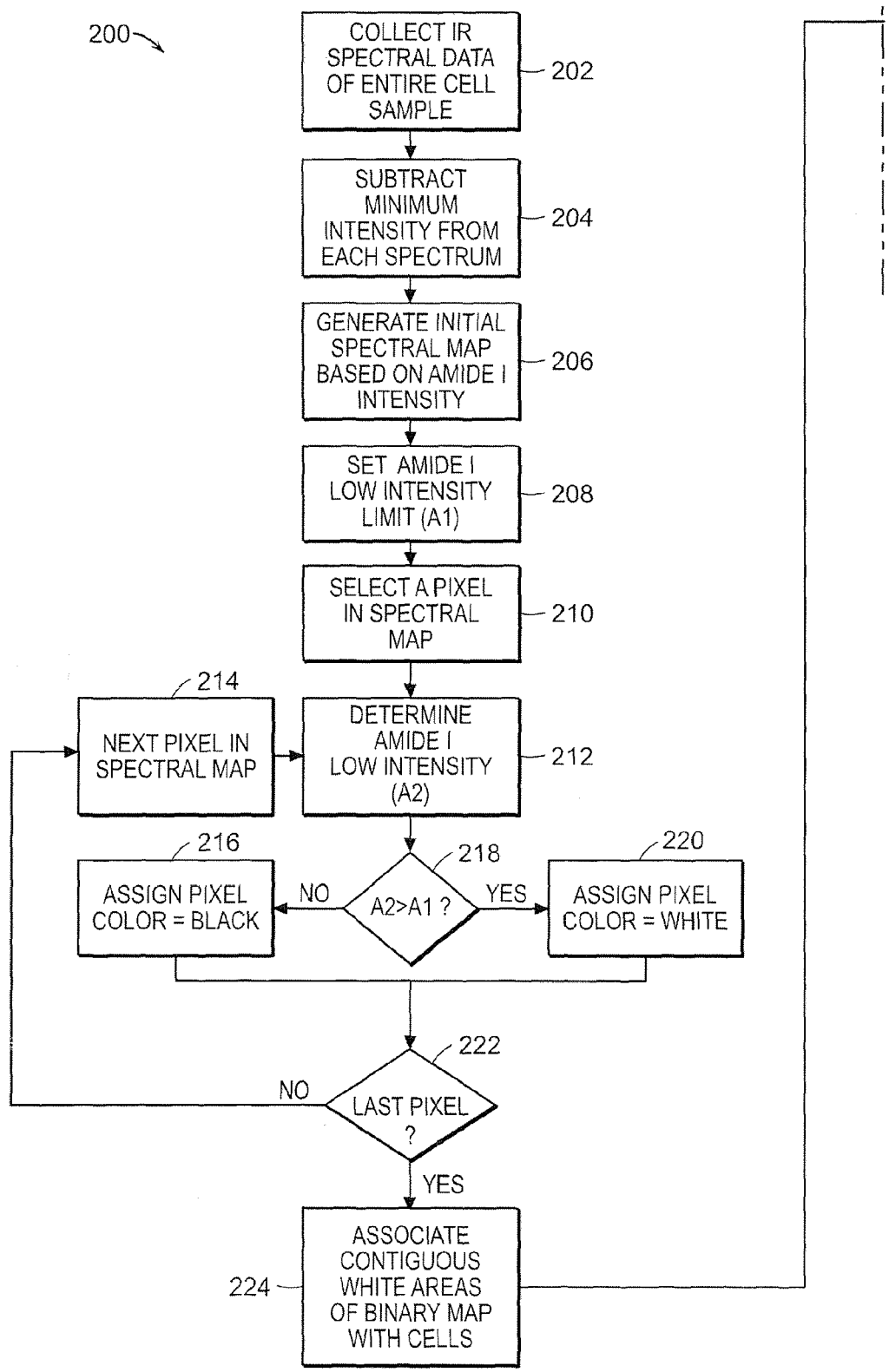
FIG. 2 is a flow diagram for an exemplary method for reconstructing cellular spectral data from pixel level spectral data in accordance with one aspect of the disclosure.
Figure 2:
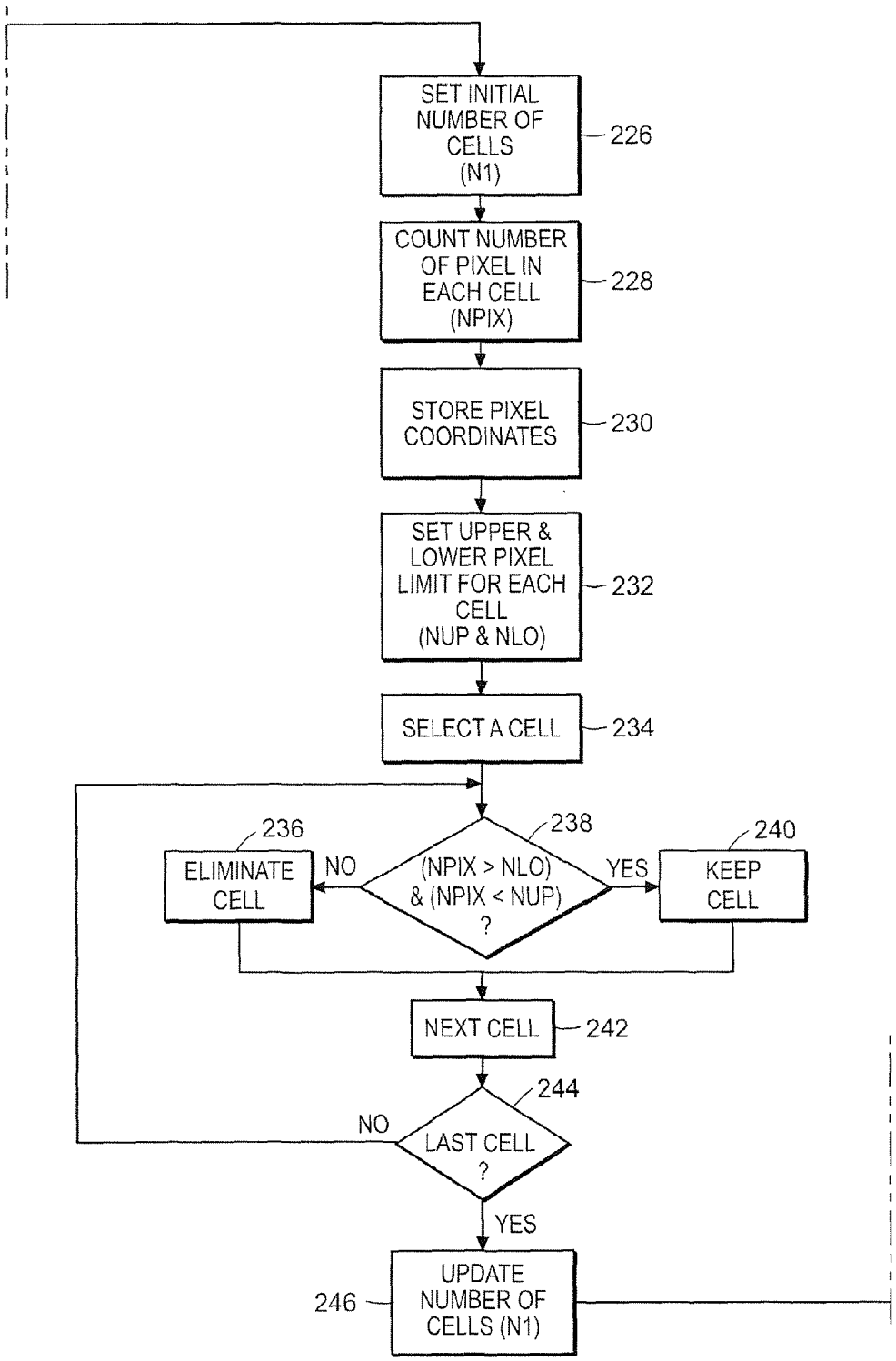
Figure 2:
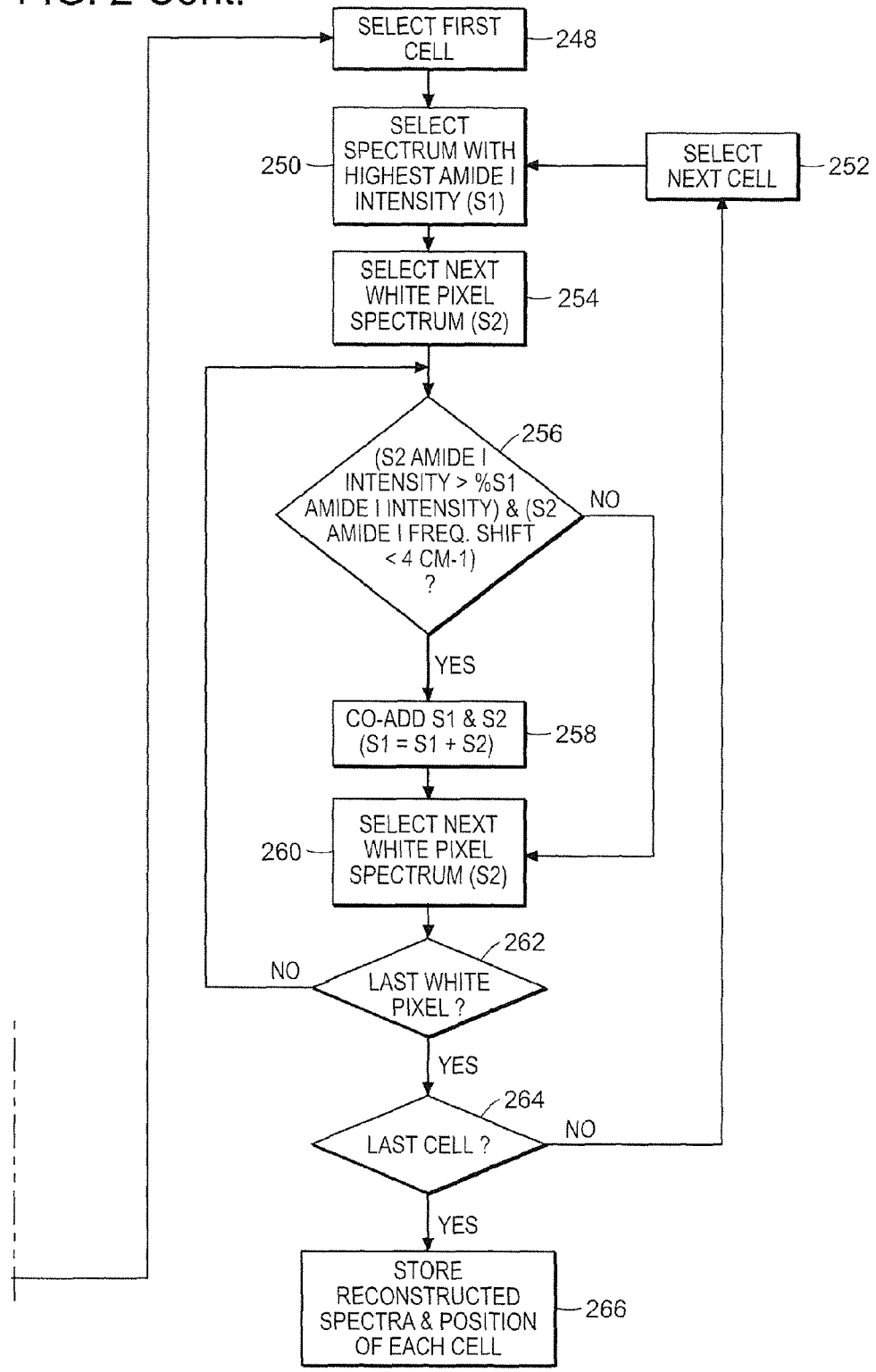

FIG. 2, generally at 200, illustrates an exemplary method for reconstructing cellular data from spectral data measured at individual pixels. That is, FIG. 2 shows in detail how step 108 shown in FIG. 1 can be performed. At step 202, infrared spectral data of the cellular sample are collected from the entire sample area on the microscope slides measuring, e.g., 4 mm×4 mm, at a pixel size of about 6.25 μm×6.25 μm (or any other pixel size significantly smaller than the size of the cells to be investigated), to generate a dataset consisting of about 409,600 pixels with each pixel including about 1600 data points, or color points. Or, infrared spectral data can be collected by mapping or imaging the vicinity of a cell, where the cell's position has been determined previously by means other than the binary mask described above. That is, each pixel contains many sample intensity measurements, each intensity being measured at a particular wavelength. For example, the intensity measurements may be made in the wavelength range of 11.1-5.5 μm, corresponding to a wavenumber range of 900-1800 cm$^{-1}$, where the wavenumber is the inverse of the wavelength and describes the number of light waves per unit length. The terms "wavenumber" and "frequency" are used interchangeably herein. Step 204 is a step to correct spectral offset. At step 204, on a pixel-by-pixel basis, the lowest intensity value of each pixel's spectrum is subtracted from each intensity value in the same pixel's spectrum to remove any intensity offset and to ensure that all spectra have positive intensity values. For example, at step 202 a pixel P can include the set of measurements ($I_1$, $I_2$, ..., $I_N$), where each measurement $I_n$ represents an intensity at a particular wavenumber. If $I_j$ is the lowest of these N values, then after step 204 the pixel P will have the values ($I_1$-$I_j$, $I_2$-$I_j$, ..., $I_N$-$I_j$). This normalization step is performed for each pixel.

Figure 4:
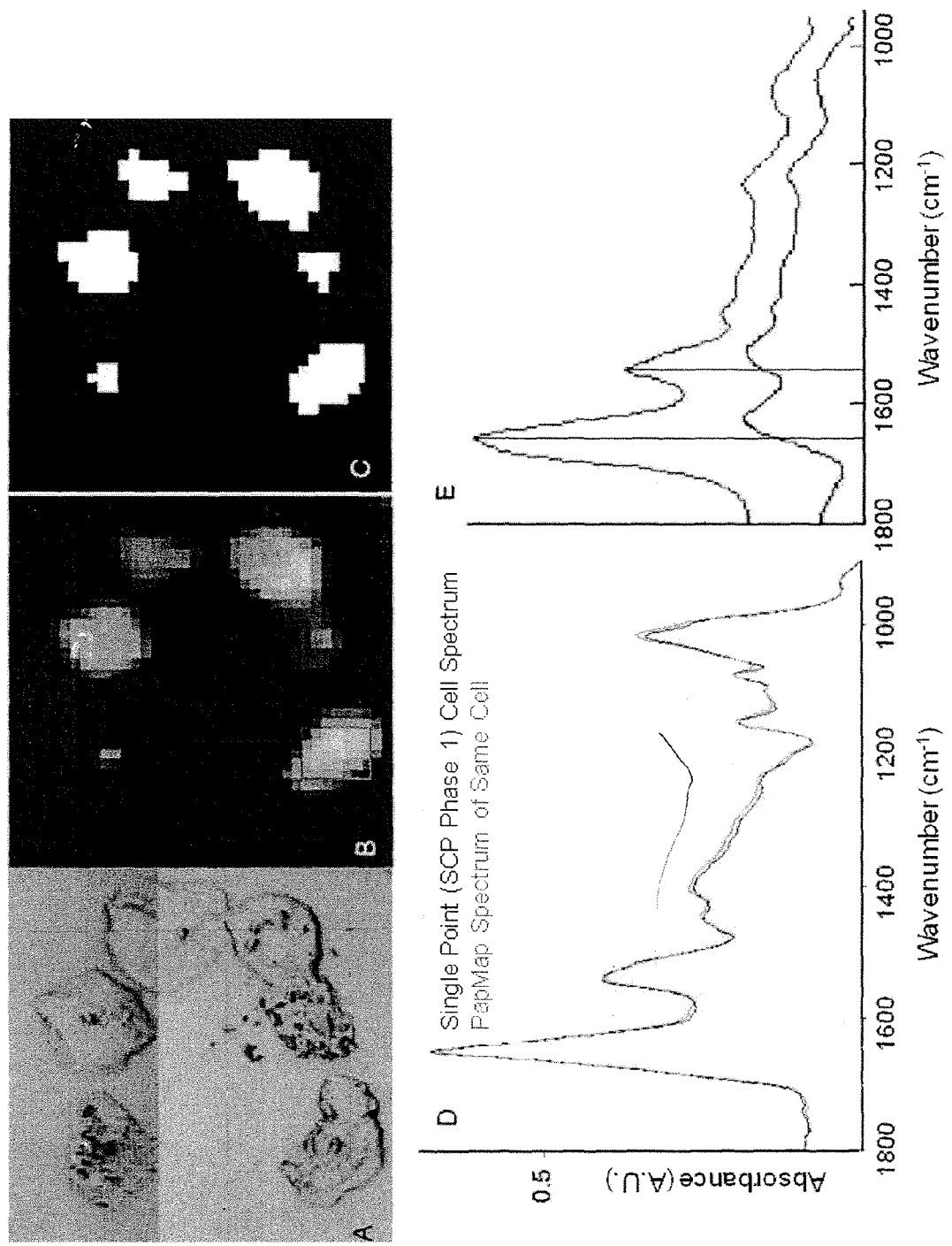
FIG. 4A shows a visual image of small section of cellular sample and containing squamous cells.
FIG. 4B shows an infrared spectral map of the cellular sample shown in FIG. 4A collected at 6.25 μm aperture.
FIG. 4C shows a binary map created from the infrared spectral map shown in FIG. 4B.
FIG. 4D shows a comparison of spectra collected via a "single point" approach and the spectra obtained from a method in accordance with an embodiment of the present disclosure.
FIG. 4E shows a comparison of an exemplary pixel spectra contaminated by dispersion artifact (bottom) with a corrected spectrum (top).

At step 206, a spectral map of the entire sampling area is created using the subtracted spectral data generated at step 204. The number of pixels in the spectral map created at step 206 is based on the sample area scanned at the predefined pixel size. The spectral map is created by assigning a grayscale value to each pixel. This grayscale value can be based on the integrated area of the "amide I" band, which occurs between wavenumbers ca. ("approximately") 1640 and 1670 cm$^{-1}$ in the infrared spectra of all proteins. The integrated area of the amide I band for a pixel P can be calculated, for example, as $$\sum_{j=x}^{y} I_j,$$

where each $I_j$ represents an intensity of the pixel measured at wavenumber j and all intensities measured at wavenumbers between ca. 1640 and 1670 cm$^{-1}$ lie within the range from x to y. Pixels with high integrated intensities in the amide I band can be assigned a white or light gray shades, and pixels with the lowest intensities can be assigned black or dark grey shades. The pixels with intensities in between the highest and lowest intensity values can be linearly mapped onto the grayscale scale between black and white. FIG. 4B shows a grey scale version of a spectral map obtained from a subset of data from an original dataset of 409,600 pixels. It will be appreciated that the spectral map can also be generated as a color image instead of as a grayscale. FIG. 4A shows a visual image corresponding to the spectral map of FIG. 4B. The grayscale value can also be based on, for example, the intensity of any band in the spectral region, the ratio between two intensity points in the spectral region, the integrated area between two intensity points in the spectral region or the ratio of the integrated area between two spectral regions.

The manner in which the amide I intensity of a pixel is determined will now be discussed. As shown in FIGS. 4D and 4E, the spectrum of a pixel in a cell measured from wavenumbers 900-1800 cm$^{-1}$ generally includes peaks corresponding to various components of the cell (i.e., due to vibrational excitation of covalently bonded atoms and groups). The peak at about 1650 cm$^{-1}$ (known as the amide I band) arises from carbonyl stretching vibrations of the peptide backbone in cell proteins, and is an indication of the presence of a cell. Thus, the amide I intensity is determined by locating the intensity peak that is closest to wavenumber 1650 cm$^{-1}$. The wavenumber at which this peak occurs is referred to herein as ($v_{aI}$) and the intensity of that peak is referred to herein as $I_{aI}$. In other words, if a pixel includes intensity measurements ($I_1$, $I_2$, ..., $I_{aI}$, ... $I_N$), then $I_{aI}$ is the amide I intensity, and the wavenumber at which $I_{aI}$ was measured is $v_{aI}$.

At step 208, a minimum amide I intensity threshold value ($I_{aImin}$) is set. For example, the minimum amide I intensity threshold value can be set to 0.15 absorbance units in order to reject any pixel that has no well-defined protein vibrations, and is therefore not due to a cell. A value of 0.15 for this threshold corresponds to a situation in which the intensity of the beam received by the detector divided by the intensity of the beam incident on the sample is equal to 0.15. In steps 210-224, the grayscale map created at step 206 is converted to a binary map by using the threshold ($I_{aImin}$). Each pixel in the binary map corresponds to one pixel in the spectral map produced at step 206, and each pixel in the binary map is set to one of two values. As illustrated (in FIG. 4C), each pixel in the binary map is set to either white or black. At step 210, a pixel from the spectral map is selected and the amide I intensity value in the pixel spectra is identified at step 212. That is, if each pixel P, in the spectral map has measurements ($I_1$, $I_2$, ..., $I_N$), and measurement $I_{aI}$ corresponds to the wavenumber of amide I ($v_{aI}$) for that pixel, then $I_{aI}$ is identified in step 212. At step 218, the amide I intensity value identified in step 212, $I_{aI}$, is compared with the minimum amide I intensity threshold value ($I_{aImin}$) set at step 208. If the amide I intensity value identified in step 212, $I_{aI}$, is greater than or equal to the threshold set at step 208, then at step 220, the corresponding pixel in the binary map is assigned white color. If the amide I intensity value identified in step 212, $I_{aI}$, is less than the threshold set at step 208, then at step 216, the corresponding pixel in the binary map is assigned black color. Step 222 determines whether the current pixel is the last pixel in the spectral map. If the current pixel is not the last pixel in the spectral map, then at step 214 next pixel in the spectral map is selected. Steps 212 through 222 are repeated until all pixels in the spectral map have been selected.

If the current pixel is the last pixel in the spectral map, then at step 224, contiguous white areas in the binary map are identified and associated with a cell or clump of cells. Next, an initial number of cells in the binary map is identified at step 226 based on the groups of contiguous white areas (i.e., the number of contiguous white areas is counted). The number of pixels in each cell (i.e., each contiguous white group) is counted at step 228, and at step 230, position coordinates of each pixel are stored.

Steps 232 through 244 refine the binary map by removing pixels associated with clumps of cells, and/or contaminants. At step 232, upper and lower limits for the number of pixels contributing to each single cell are set. For example, upper and lower limits for the number of pixels contributing to one cell can be set in order to remove from the binary map pixels contributing to overlapping squamous cells measuring more than about 60 μm across. As an example, an upper limit of 90 pixels prevents contiguous white pixels in the binary map that correspond to large mature squamous cells, or that correspond to large clumps of overlapping cells, from being further analyzed. The lower limit for the number of pixels defining a cell can be set at about 15 to prevent contiguous white pixels in the binary map that correspond to contaminants from being further analyzed. Exemplary contaminants include, but are not limited to, erythrocytes (red blood cells, which measure about 6 μm, or 1 pixel, in size), naked nuclei of fragmented cells, and the like.

At step 234, a single cell (i.e., a single group of contiguous white pixels) from the cells identified in the binary map is selected. At step 238, the number of pixels associated with the cell is compared to the upper and lower pixel limits set at step 232. If the number of pixels in the selected cell is not within the upper and lower pixel limits, then at step 236 the selected cell is discarded. If the number of pixels in the selected cell is within the upper and lower pixel limits, then at step 240, the selected cell is included for subsequent analysis. A next cell in the binary map is selected at step 242. At step 244, the method determines whether all cells (i.e., contiguous white groups of pixels) have been compared against the upper and lower limits. If all cells have not yet been compared, then another cell is selected and compared to the limits in step 238. If at step 244, all cells have been compared against the upper and lower limits, then control moves to step 246.

In other words, steps 234-244 screen out regions of contiguous white pixel areas in the binary map that are either too big or too small to be cells of interest. These steps in effect produce a refined binary map, by discarding the regions that were too big or too small. The resulting binary map from step 244 delineates the pixels that belong to cells of interest in the sample.

FIG. 4C shows an exemplary binary map created from spectral map shown in FIG. 4B, which corresponds to the cellular sample image shown in FIG. 4A. The binary map shown in FIG. 4C identifies six cells of interest, each cell corresponding to one of the contiguous groups of white pixels. At step 246, the number of cells in the sample is updated to equal the number of cells identified in the refined binary map from step 244.

The spectrum of each cell identified in the binary map is reconstituted from the individual pixel spectra using steps 248 through 262. At step 248, a single cell is selected from the cells identified in the refined binary map produced at step 244. At step 250, the pixel in the cell that has the highest amide I intensity value ("$I_{aImax}$") is identified. The pixel with the highest amide I intensity (i.e., the $I_{aImax}$ value) corresponds to the region of the cell with the highest protein concentration, normally the nucleus of the cell. Next, a white pixel that is associated with the same cell and that is adjacent to the pixel selected at step 250 is identified at step 254. The pixel identified at step 254 may correspond to the perinuclear region of the cell.

At step 256, two criteria (both of which are described below) of the selected pixel are checked. If the pixel meets both criteria, then the spectrum of the selected pixel is co-added to the spectrum of the pixel with the $I_{aImax}$ value. Two spectra are co-added as follows. If pixel i ($p_i$) contains intensity measurements ($I_{pi1}$, $I_{pi2}$, ..., $I_{piN}$) and pixel n ($p_n$) contains intensity measurements ($I_{pn1}$, $I_{pn2}$, ..., $I_{pnN}$), then the co-addition of the spectra from pixels i and n is produced by summing the intensity measurements component-by-component, to produce ($I_{pn1}+I_{pi1}$, $I_{pn2}+I_{pi2}$, ..., $I_{pnN}+I_{piN}$). This co-added spectrum is a "reconstructed" spectrum. Steps 252-264 reconstruct the spectrum of a cell by co-adding the spectra of all pixels in the cell that meet the criteria checks performed in step 256. Also at step 256, the pixel could be selected by, for example, the intensity of any band in the spectral region, the ratio between two intensity points in the spectral region, the integrated area between two intensity points in the spectral region or the ratio of the integrated area between two spectral regions.

The first of the two criteria checks at step 256 is to compare the amide I intensity (i.e., the $I_{aI}$ value) in the pixel selected at step 254 with a threshold intensity value to determine whether the amide I intensity ($I_{aI}$) is greater than or equal to the threshold intensity value. The threshold can be set to a predefined percentage (e.g., 66 percent) of the $I_{aImax}$ value (i.e., a percentage of the $I_{aI}$ value of the pixel in the cell that had the highest amide I intensity, the $I_{aImax}$ value). If the $I_{aI}$ value of the pixel is below the threshold, then the pixel is discarded (i.e., its spectrum is not co-added to that of other pixels in the cell). This evaluation at step 256 eliminates pixel spectra associated with the outer edges of the cytoplasm, which are generally thin, and are associated with weak and noisy spectra.

If the pixel meets the amide I intensity criteria (i.e., its $I_{aI}$ value is greater than the threshold), then step 256 further determines whether the pixel is associated with edge artifacts.

Exemplary edge artifacts include, but are not limited to, dispersion artifacts, artifacts caused by reflective and/or absorptive components of the pixel, artifacts caused by inaccurate phase corrections, and the like. At step 256, the wavenumber (i.e, the $v_{aI}$ value) corresponding to amide I intensity (i.e., the $I_{aI}$ value) in the pixel is compared with the wavenumber (i.e, the $v_{aImax}$ value) corresponding to the highest amide I intensity (i.e., the $I_{aImax}$ value) in the cell. If the $v_{aI}$ value is not equal to the $v_{aImax}$ value, then the shift in the $v_{aI}$ value from the $v_{aImax}$ value (i.e., the $\Delta(v_{aImax}-v_{aI})$, that value being equal to the absolute value of ($v_{aImax}-v_{aI}$) is determined. Further at step 256, the $\Delta(v_{aImax}-v_{aI})$ value is compared with a threshold amide I wavenumber shift value to determine whether the $\Delta(v_{aImax}-v_{aI})$ value is less than or equal to the threshold wavenumber shift value. For example, the threshold wavenumber shift value can be set to 4 cm$^{-1}$.

FIG. 4E shows a comparison of an exemplary pixel spectra contaminated by dispersion artifact (bottom) with an uncontaminated spectrum (top). In FIG. 4E, the amide I wavenumber in the contaminated spectrum is about 1610 cm$^{-1}$ and the amide I wavenumber in the good spectrum is about 1650 cm$^{-1}$. If the amide I wavenumber shift (the $\Delta(v_{aImax}-v_{aI})$ value) of the pixel is less than or equal to the threshold wavenumber shift value, then at step 258, the spectrum of the pixel is co-added to that of other pixels in the cell. Otherwise, the pixel is discarded and not co-added with other pixels.

At step 262, the method determines whether all pixels in the cell have either been discarded or had their spectra co-added to the spectra of other pixels in the cell. If white pixels in the cell remain that have not been so discarded or co-added, then control returns to step 256. Otherwise, control proceeds to step 264.

Similarly, at step 264, the method determines whether all cells identified in the refined binary map (produced at step 244) have had their spectra reconstructed (by co-addition of spectra of pixels in the cell). If all cells have had their spectra reconstructed, then control proceeds to step 266. Otherwise, control proceeds to step 252 so another cell can be selected and the spectra of that cell can be reconstructed. At step 266, the co-added spectrum of each cell is stored along with the position coordinates of the cell. As an example, the position coordinates of a cell can correspond to center of absorbance of that cell. The cell spectrum can be constructed by co-adding from about 30 to about 70 individual pixel spectra.

FIG. 4D shows an exemplary cellular spectrum constructed by co-adding 15 (out of 36) individual pixel spectra corresponding to a single cell identified in the binary map shown in FIG. 4B. FIG. 4D also shows a comparison of the cellular spectrum obtained using the method discussed above (shown in gray) with a single point cellular spectrum (shown in black) of the same cell obtained using conventional techniques.

FIG. 4D illustrates that the co-addition process described in connection with FIG. 2 results in a spectrum (shown in gray) that is almost identical to the single point cellular spectrum (shown in black). That is, the spectrum of a cell produced according to the method described in connection with FIG. 2 is of similar quality to the spectrum of the same cell produced by conventional techniques. The method described in connection with FIG. 2 is advantageous, as compared to conventional techniques, though at least because the spectra of each pixel can be sampled in a regular fashion at a fixed aperture. The loss of signal-to-noise ratio in any given pixel, caused by sampling at an aperture that is smaller than a cell, is recovered by the co-addition process. That is, the co-addition process results in a gain in SNR by a factor of about 4 to 8. This gain in SNR compensates for the loss in signal quality of individual pixel spectra due to data collection at a very low effective aperture (e.g., 6.25 µm×6.25 µm).

Figure 2A:
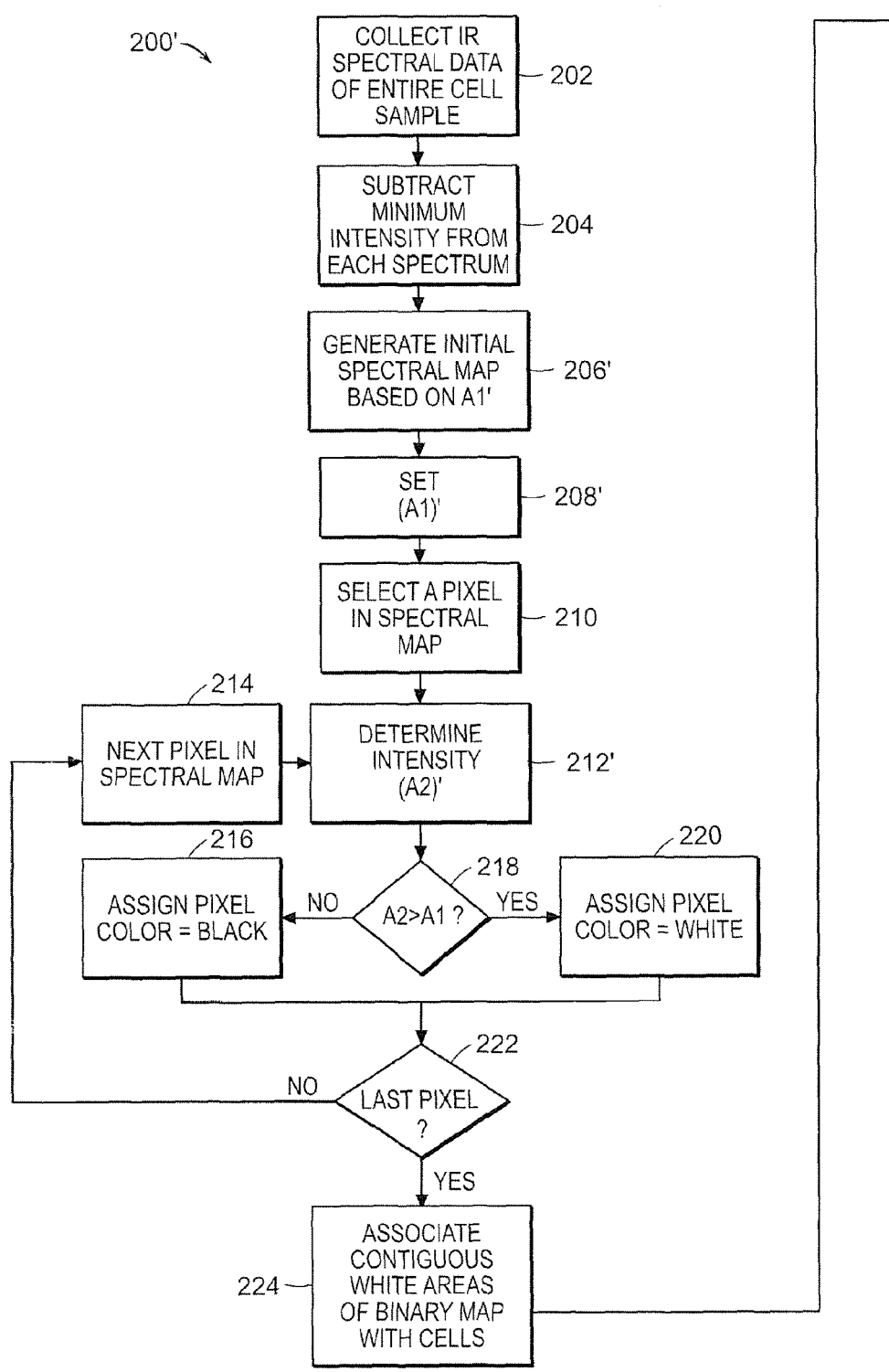
FIG. 2A is a flow diagram for an alternate method for reconstructing cellular spectral data from pixel level spectral data in accordance with an aspect of the disclosure.
Figure 2A:
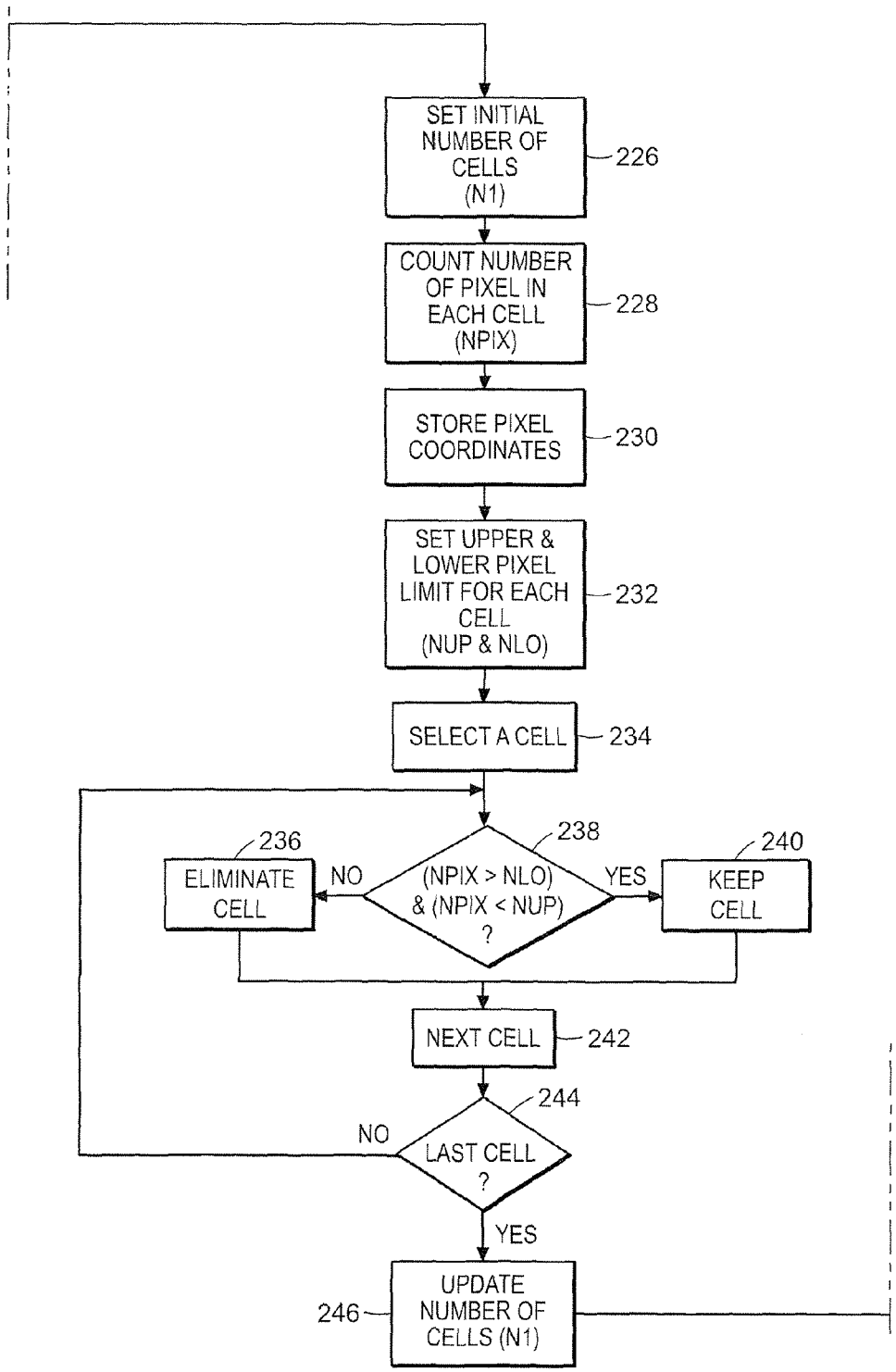
Figure 2A:
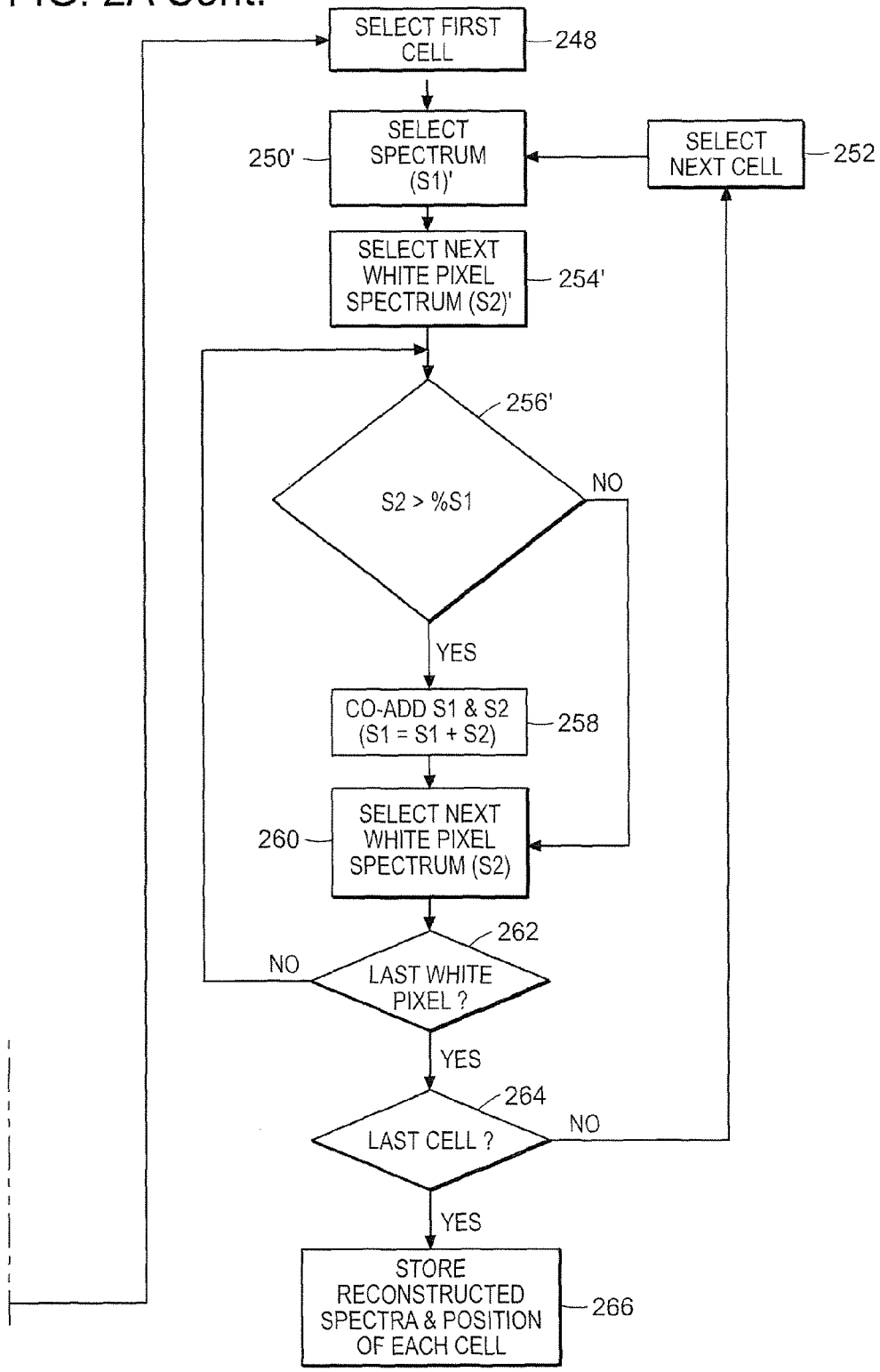

FIG. 2A shows method 200', which is an alternative to the method 200 discussed above for generating the reconstructed spectrum of a cell. Method 200' shown in FIG. 2A is similar to method 200 of FIG. 2 and employs many of the same steps. However, instead of steps 206, 208, 212, 250, 254, and 256, method 200' uses steps 206', 208', 212', 250', 254', and 256', respectively. The asterisks in steps 206', 208', 212', 250', and 254' mean that the spectra for those steps (e.g., A1 for step 206') may be in the form of transmittance, absorbance, reflectance, derivative or interferogram and are generated by any of the following: (a) measuring the intensity at any wavenumber; (b) calculating the ratio between two intensity values at any wavenumber; (c) calculating the integrated area between two intensity values at any wavenumber; or (d) calculating the ratio of an integrated area between two intensity values at any wavenumber. In step 206', the spectral map can be based on any selected intensity as opposed to just the intensity or the integrated area of the amide I band as was the case in step 206. Similarly, in steps 208' and 212', the minimum threshold A1 can be compared to any selected value of the pixel as opposed to the amide I intensity value. Also, in step 250', a pixel can be selected based on having a maximum value at any selected wavenumber and the wavenumber corresponding to amide I need not be used. Then in steps 254 and 256, pixels are retained or discarded based on intensity at a particular wavenumber and again the wavenumber corresponding to amide I need not be used.

A variety of cells can be examined using the present methodology. Such cells may be exfoliated cells including epithelial cells. Epithelial cells are categorized as squamous epithelial cells (simple or stratified, and keritized, or non-keritized), columnar epithelial cells (simple, stratified, or pseudostratified; and ciliated, or nonciliated), and cuboidal epithelial cells (simple or stratified, ciliated or nonciliated). These epithelial cells line various organs throughout the body such as the intestines, ovaries, male germinal tissue, the respiratory system, cornea, nose, and kidney. Endothelial cells are a type of epithelial cell that can be found lining the throat, stomach, blood vessels, the lymph system, and the tongue. Mesothelial cells are a type of epithelial cell that can be found lining body cavities. Urothelial cells are a type of epithelial cell that are found lining the bladder. These cell types have been distinguished by the method described here (summarized in Table 1).

TABLE 1

| System | Tissue | Epithelium Type |
|---|---|---|
| circulatory | blood vessels | Simple squamous |
| digestive | ducts of submandibular glands | Stratified columnar |
| digestive | attached gingiva | Stratified squamous, keratinized |
| digestive | dorsum of tongue | Stratified squamous, keratinized |

TABLE 1-continued

| System | Tissue | Epithelium Type |
|---|---|---|
| digestive | hard palate | Stratified squamous, keratinized |
| digestive | oesophagus | Stratified squamous, non-keratinised |
| digestive | stomach | Simple columnar, non-ciliated |
| digestive | small intestine | Simple columnar, non-ciliated |
| digestive | large intestine | Simple columnar, non-ciliated |
| digestive | rectum | Simple columnar, non-ciliated |
| digestive | anus | Stratified squamous, non-keratinized superior to Hilton's white line Stratified squamous, keratinized inferior to Hilton's white line |
| endocrine | thyroid follicles | Simple cuboidal |
| digestive | gallbladder | Simple columnar, non-ciliated |
| nervous | ependyma | Simple cuboidal |
| lymphatic | lymph vessel | Simple squamous |
| integumentary | skin - dead superficial layer | Stratified squamous, keratinized |
| integumentary | mesothelium of body cavities | Simple squamous |
| mammary | ductal and lobular epithelium | columnar |
| reproductive - female | ovaries | Simple cuboidal |
| reproductive - female | Fallopian tubes | Simple columnar, ciliated |
| reproductive - female | uterus | Simple columnar, ciliated |
| reproductive - female | endometrium | Simple columnar |
| reproductive - female | cervix (endocervix) | Simple columnar |
| reproductive - female | cervix (ectocervix) | Stratified squamous, non-keratinised |
| reproductive - female | vagina | Stratified squamous, non-keratinised |
| reproductive - female | labia majora | Stratified squamous, keratinised |
| reproductive - male | tubuli recti | Simple cuboidal |
| reproductive - male | ductuli efferentes | Pseudostratified columnar |
| reproductive - male | epididymis | Pseudostratified columnar, with stereocilia |
| reproductive - male | vas deferens | Pseudostratified columnar |
| reproductive - male | ejaculatory duct | Simple columnar |
| reproductive - male (gland) | bulbourethral glands | Simple columnar |
| reproductive - male (gland) | seminal vesicle | Pseudostratified columnar |
| reproductive - male | prostate | columnar |
| respiratory | oropharynx | Stratified squamous, non-keratinised |
| respiratory | larynx | Pseudostratified columnar, ciliated |
| respiratory | larynx - True vocal cords | Stratified squamous, non-keratinised |
| respiratory | trachea | Pseudostratified columnar, ciliated |
| respiratory | respiratory bronchioles | Simple cuboidal |
| sensory | cornea | Stratified squamous, non-keratinised |
| sensory | nose | Pseudostratified columnar |
| urinary | kidney - ascending thin limb | Simple squamous |
| urinary | kidney - distal convoluted tubule | Simple cuboidal, non-ciliated |
| urinary | kidney - collecting duct | Simple cuboidal |
| urinary | renal pelvis | Transitional |
| urinary | ureter | Transitional |
| urinary | urinary bladder | Transitional |
| urinary | prostatic urethra | Transitional |
| urinary | membranous urethra | Pseudostratified columnar, non-ciliated |
| urinary | penile urethra | Pseudostratified columnar, non-ciliated |
| urinary | external urethral orifice | Stratified squamous |

Disorders affecting any of these cells are detectable using the methodology of the present disclosure. For example, this methodology detects viral infections, such as, but not limited to, Herpes simplex, HPV, and Epstein Barr virus, and disorders such as dysplasia and malignancy-associated changes indicative of cancer, and changes of cellular maturation and differentiation that can be indicative of a pre-disease state such as benign reactive changes including hyperplasia, metaplasia, and inflammation.

As described in the examples below, several experiments have established the utility of the reconstructed spectra generated according to the method described above in connection with FIG. 2. For example, reconstructed spectra have been generated for three broad categories of cells: (a) normal cells collected from normal patients; (b) cells that appear morphologically normal that were collected from patients known to have a disorder; and (c) cells that appear morphologically abnormal that were collected from patients known to have a disorder. Conventional morphological analysis can discriminate between types (a) and (c) (i.e., cells that appear morphologically normal and cells that appear morphologically abnormal). However, conventional morphological analysis does not discriminate between types (a) and (b) (i.e., normal cells and cells that visually appear normal that were collected from patients with known disorders). However, as described below, the reconstructed spectra of the type (b) cells (i.e., cells that visually appear normal that were collected from patients with known disorders) are different than, and can be discriminated from, the type (a) cells (i.e., normal cells). Methods described below readily and automatically discriminate between type (a) cells and type (b) cells thus allowing earlier and more reliable diagnosis than is possible with conventional morphological techniques.

A more complete understanding of the present disclosure can be obtained by referring to the following illustrative examples of the practice of the disclosure, which examples are not intended, however, to unduly limit the disclosure.

EXAMPLES

The following examples illustrate the results obtained from analysis of cytological samples using the methods of the present disclosure.

Example 1

Spectral Analysis of Oral Mucosal Samples

This example illustrates the analysis of cytological samples of oral mucosa cells, exfoliated from a patient with a Herpes simplex outbreak in the oral cavity, using the methods of the present disclosure. The cytological samples of oral mucosa cells were obtained from New England Medical Center (NEMC), Boston, Mass. Infrared pixel level spectral data of these samples were acquired from the entire sample area. Infrared spectra of individual cells in the sample were then reconstructed from the sampled area using the technique described above in connection with FIG. 2. Subsequently, the reconstructed cell spectra were analyzed by unsupervised methods of multivariate statistics, in particular, by Principal Component Analysis (PCA), to establish whether or not spectral differences could be found that are indicative of the disease.

Figure 7:
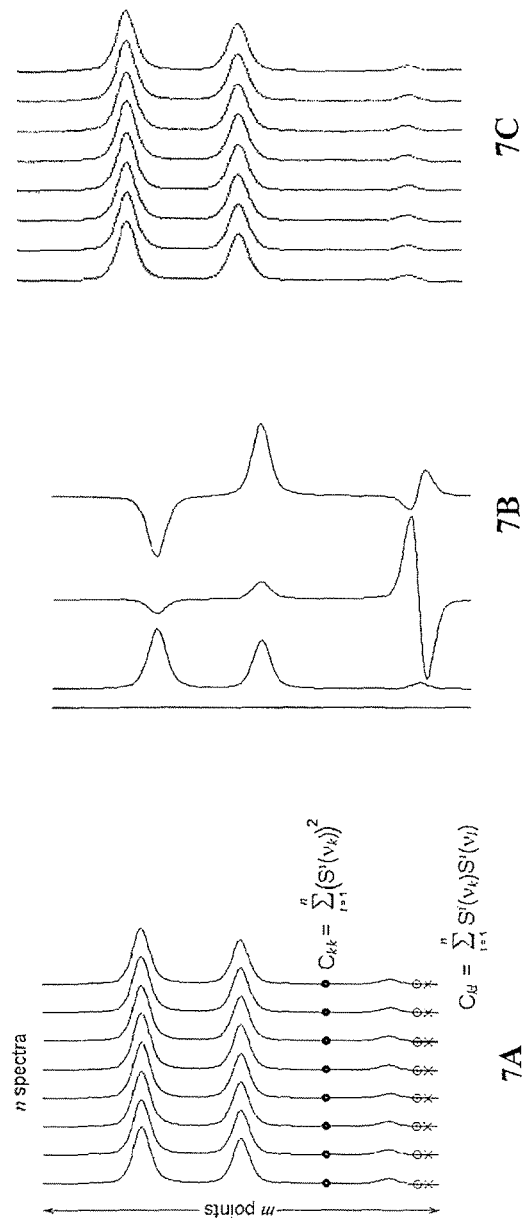
FIG. 7 illustrates the manner in which Principal Component Analysis (PCA) is used to analyze reconstructed cell spectra.

FIG. 7 illustrates the principles of PCA. FIG. 7A illustrates eight simulated spectra, similar to those which are reconstructed spectra for each of eight cells. As shown, the eight spectra are all similar, but not identical. A set of "basis spectra" are then created from the spectra of the cells shown in FIG. 7A. FIG. 7B delineates an example of three such basis spectra. The basis spectra are chosen to contain the maximum variance in the original dataset. Subsequently, each of the cell spectra shown in FIG. 7A are reproduced as linear combinations of the basis spectra. That is, each spectrum $S_j$, can be expressed as $$S_j \cong \sum_{n=1}^{N} a_{jn} B_n,$$

where $B_n$ is the nth basis spectra (there are N basis spectra), and $a_{jn}$ is the nth coefficient for the jth spectra. Since each spectrum can be expressed as a linear sum of the basis spectra, the basis spectra can be thought of as "principle components" of the spectra. FIG. 7C illustrates the reconstructed spectra that are formed as linear combinations of the basis spectra, and as illustrated, the artificially reconstructed spectra shown in FIG. 7C are substantially identical to the original spectra shown in FIG. 7A. The coefficients can then be used to discriminate between the cells. The basis spectra are generated by computing the variances between the original reconstructed spectra (e.g., as shown in FIG. 7A), arranging those variances in a matrix and then solving for the matrix's eigenvalues. This technique of computing basis spectra and then resolving original spectra into principle components is well known and is described for example in Adams, M. J., *Chemometrics in Analytical Spectroscopy*. 2nd ed.; Royal Society of Chemistry: Cambridge, 2004.

The first basis spectrum is simply the average of all spectra and is generally not of much use in discriminating between cells. Also, coefficients for higher order basis spectra tend to be small, or negligible, and are also generally not of much use in discriminating between cells. However, the coefficients of the $2^{nd}$, $3^{th}$, and $4^{th}$ components are often useful for discriminating between cells that have different characteristics.

Figure 9:
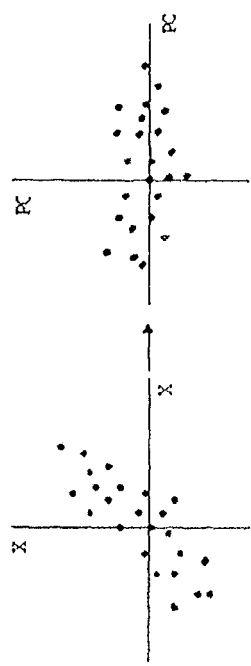
FIG. 9 illustrates calculation of the second and third principle components PC2 and PC3 of a principle component analysis for an example set of data.

The aim of PCA is to reduce a large number of variables down to a small number of summary variables, or principal components (PCs), that explain most of the variance in the data. All PCs are orthogonal and each successive component expresses decreasing amounts of variation with most of the variation explained by the first few components. This enables the multi-dimensional data to be represented in two or three dimensions, which are easily visualized. The technique works by transforming the original variables onto a new set of axes in the direction of the greatest variation in the data. FIG. 9 shows an example of how the second and third principle components, PC2 and PC3 are measured for an example data set. FIG. 9 represents plots of observations on two variables $X_1$, $X_2$ (left) and the same observations plotted with respect to their principal components $PC_2$, PC3 (right).

Referring to FIG. 9, the second principle component (PC2) is oriented along the axis of greatest variance of the variables in the data matrix about their means (i.e., averages). The third principle component (PC3) is independent of (orthogonal to) the second PC and is the vector along the axis of next largest variance in the data. Succeeding PCs can be calculated which will be orthogonal to the preceding ones and which explain some of the remaining variance. The PCs are linear combinations of the original variables, which are fitted in the least squares sense through the points in measurement space. These new variables usually result in a reduction of variables from the original set and often can be correlated with physical or chemical factors.

Figure 5:
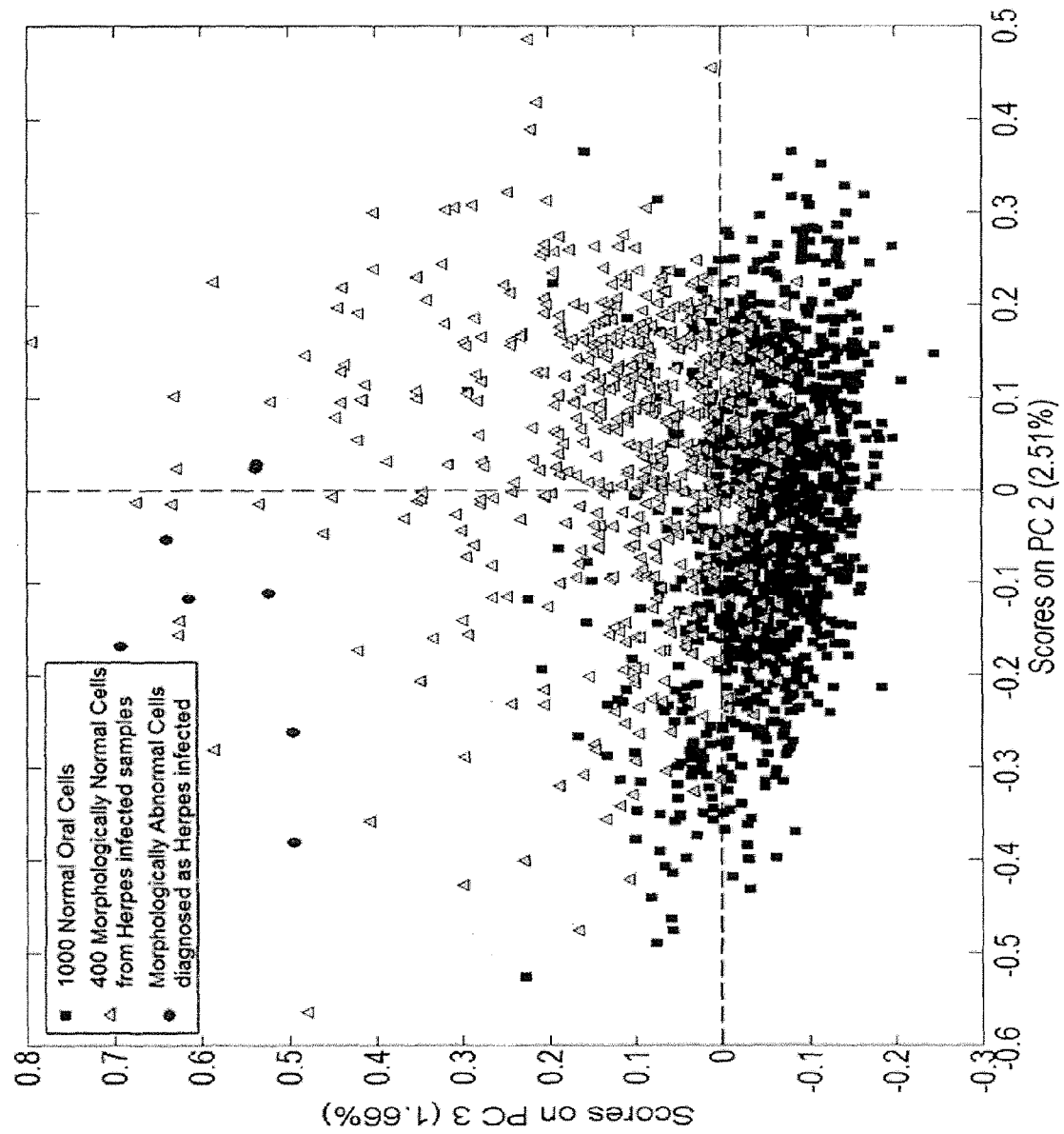
FIG. 5 shows a "Scores plot" of normal oral mucosa cells (triangles) and herpes simplex-infected oral mucosa cells (crosses).

FIG. 5 shows a PCA "Scores Plot" of the analysis for oral mucosa cells. The data set analyzed consisted of ca. 1000 spectra of cells harvested from five healthy volunteers, and ca. 400 spectra of cells collected from a patient with an acute oral herpes simplex lesion. These cells were harvested directly from the lesion, where the majority of these cells are likely to be infected by the virus. Visual inspection of these cells, stained after infrared data acquisition, confirmed that these cells were infected by the virus.

In FIG. 5, the X axis represents the coefficient of the $2^{nd}$ principal component and the Y axis represents the coefficient of the $3^{rd}$ principal component. That is, the spectra of all cells were reconstructed from pixel level spectra according to the method described in connection with FIG. 2, each of those spectra were then expressed as a linear sum of basis vectors as described in connection with FIG. 7, and then the spectra of each cell was plotted as a single point on FIG. 5. The location on FIG. 5 of each point was determined by the coefficients for the second and third basis spectra for the reconstructed spectra corresponding to that point. In FIG. 5, the normal cells (shown as triangles) form a tight cluster which is well separated from the virus-infected cells (shown as crosses). Thus, FIG. 5 shows how PCA can be used to discriminate between cells with different characteristics, in this case normal cells from virus-infected cells. It should be noted that the method for analyzing the spectra, PCA, is by no means an increased diagnostic algorithm, but simply a procedure that established whether or not there are quantifiable differences between groups of spectra. Thus, this result presents proof-of-concept that the methods in accordance with an embodiment of the present disclosure can distinguish spectral patterns due to a viral infection.

Example 2

Spectral Analysis of Cervical Sample

This example illustrates the analysis of cervical samples diagnosed with low grade/high grade squamous intraepithelial lesions (LGSIL/HGSIL) using the methods of the present disclosure. The cervical samples were obtained from NEMC, and were from women whose standard cytopathological diagnoses were CIN II/CIN III (CIN diagnoses represent tissue diagnostic grades of cervical intraepithelial neoplasia, grades I to III). These samples were collected using gynecological brushes that were delivered to the inventors in standard fixation solution. Cervical dysplasia is a disease that starts in small foci, typically between 0.5 to a few millimeter in size. Thus, sampling of the entire cervical area (several square centimeters in size) generally includes a majority of normal cells mixed with a few abnormal cells. The degree of disease in these cells may vary from very mild atypia to more serious SIL, or even carcinoma in situ. As with Example 1, infrared pixel level spectral data of these samples were acquired from the entire sample area. The infrared spectral data were processed using the methods in accordance with an embodiment of the present disclosure to construct cellular spectra from the individual pixel spectra as described in connection with FIG. 2. Subsequently, the cell spectra were analyzed by unsupervised methods of multivariate statistics, in particular, by Principal Component Analysis (PCA), as described in connection with FIG. 7, to establish whether or not spectral differences could be found that are indicative of disease.

Figure 6:
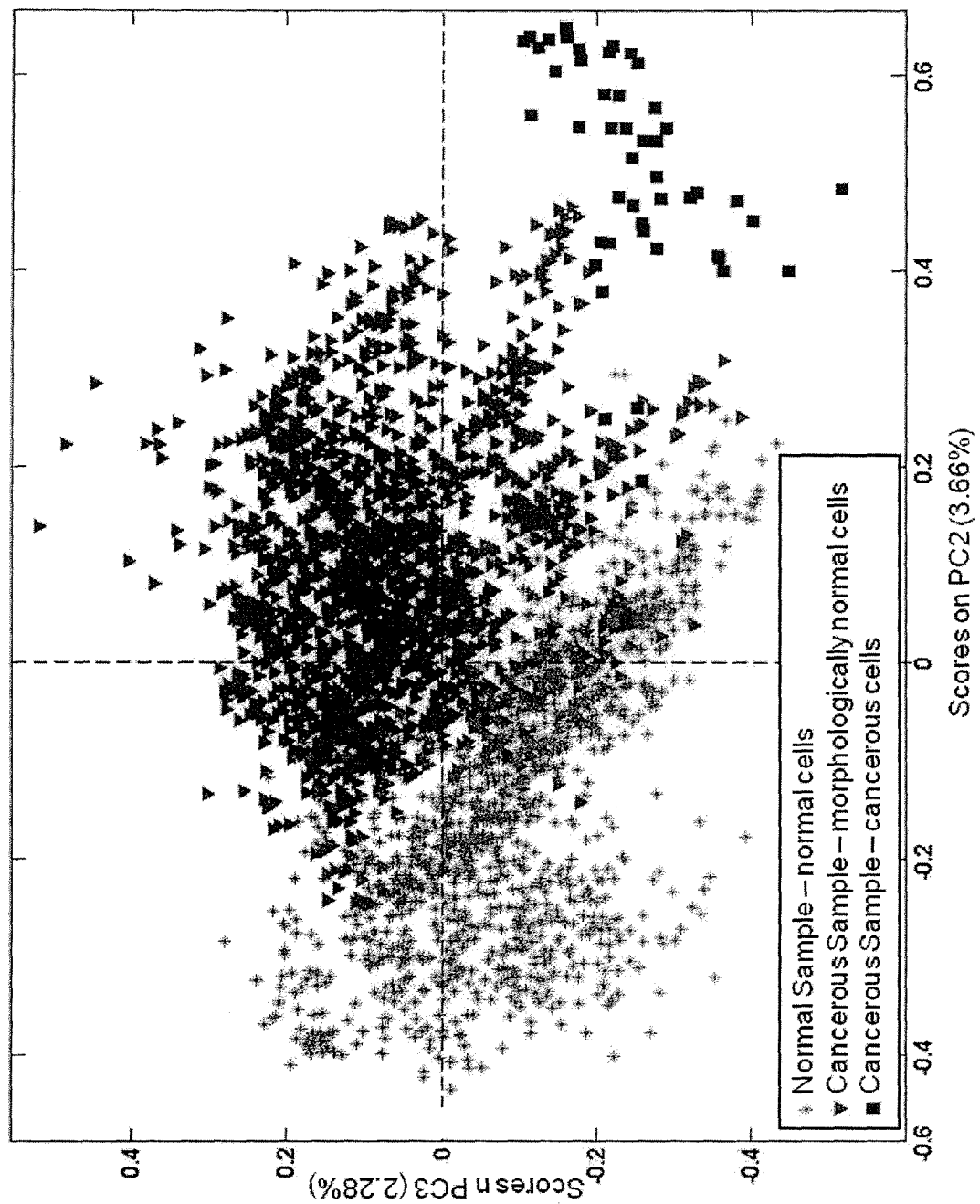
FIG. 6 shows a "Scores plot" of cervical cells from two samples diagnosed as CIN II/CIN III.

FIG. 6 illustrates that early stages of cervical cancer can be detected by infrared spectral methods in accordance with an embodiment of the present disclosure. Analysis of normal cells by infrared spectroscopy and PCA generally show a near-spherical distribution in the scores plot. The cells in FIG. 6, whose scores along the PC 2 (i.e., second principal component) axis fall in the range of between 0.3 to 0.8, fall outside the near-spherical distribution of the normal cells, and upon visual inspection, show morphologies consistent with dysplasia. These results demonstrate that infrared spectral discrimination of abnormal cells in exfoliated samples of cervical cells is possible. Furthermore, these data suggest that a quantitative scale of spectral diagnosis can be established.

Example 3

Reconstructed Spectra Versus Morphology

Figure 8:
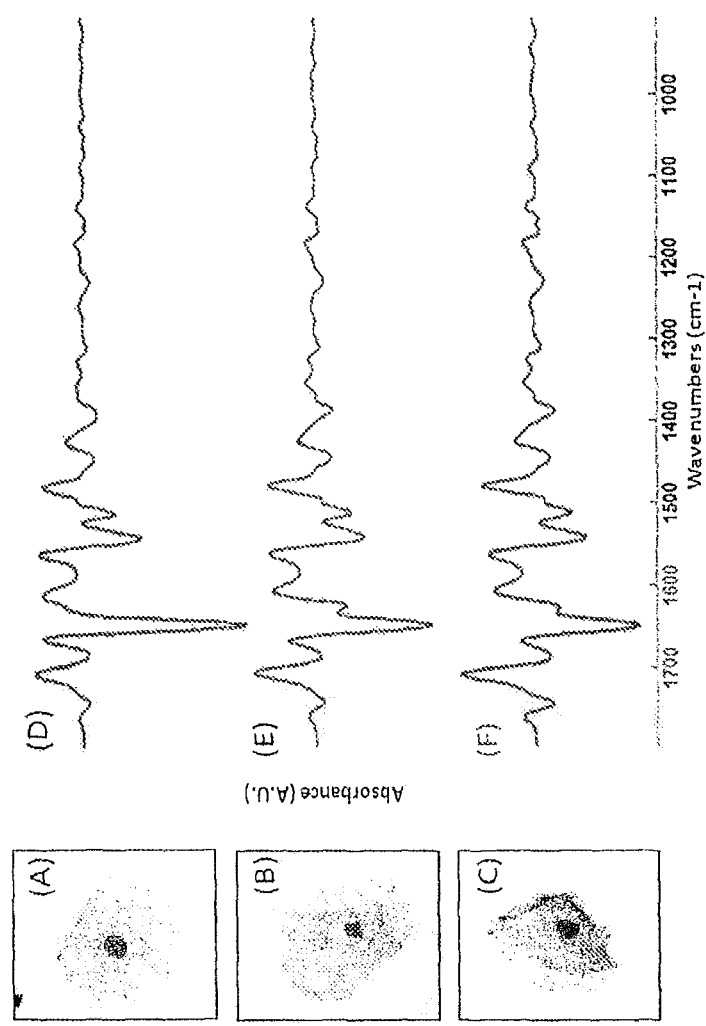
FIG. 8 shows photographs of cells that all appear to be normal based on their morphology, some of which are abnormal and detected to be so by methods disclosed herein.

FIG. 8 shows photographs of three cells. Panel A shows a photograph of a normal cell. Panel B shows a cell that appears normal based on its morphology but in fact has cellular spectra indicative of LSIL/HSIL. Panel C shows a cell that appears normal based on its morphology but in fact has cellular spectra indicative of HSIL.

FIG. 8 thus illustrates the usefulness of the method shown in FIG. 2 for reconstructing cellular spectra. All of the cells shown in FIG. 8 appear normal based on their morphology. Panels A-C display representative (40x) visual images of (A) a normal cell from a normal sample, (B) a cell from a sample diagnosed by classical cytopathology as LSIL/HSIL but with normal morphology and (C) a cell from a sample with a history of HSIL but with normal morphology, Panels D-F display the second derivative infrared spectra recorded for each of the cells displayed in panels A-C, respectively. Thus, a conventional morphological examination (e.g., a PAP examination) of the cells shown in FIG. 8 would likely result in a diagnosis of "normal." However, the reconstructed cellular spectra for the cells shown in FIG. 8, produced according to the method described above in connection with FIG. 2, indicate that the cells in Panels B and C are abnormal. Had these cells been allowed to continue to grow, it is believed that they would have eventually developed the morphological features typically indicative of LSIL/HSIL and HSIL.

The reconstructed cellular spectra for the cells shown in panels A-C are shown in FIGS. 8D-8F, respectively. As shown, the reconstructed spectra for the normal and abnormal cells appear similar, but they in fact contain differences that allow the normal cells to be discriminated from the abnormal cells. For example, the automated principle component analysis disclosed herein distinguishes the normal cells from the abnormal cells.

Example 4

Sample Preparation

Clinical oral samples were obtained in collaboration with the Pathology Department at Tufts Medical Center (Boston, Mass. USA) after routine testing and follow-up had been performed. Samples (on cytological brushes) were stored in SurePath® solution (Burlington, N.C. USA). Subsequently, cells were vortexed free of the brushes, filtered to remove debris, and deposited onto reflective substrates ("low-e" slides, Kevley Technologies, Chesterland, Ohio USA) using cytocentrifugation (CytoSpin, Thermo, Waltham, Mass. USA).

Normal oral cytology samples were collected from healthy laboratory volunteers at Northeastern University under a local IRB. These exfoliations of normal oral cavity cells were obtained from five regions of the mouth, to correlate specific spectral changes contributed by origin of the oral cavity. Samples were taken from the cheeks, tongue, hard palate, gums, and floor of the mouth. Before sampling, the subjects pre-rinsed their mouth with water to generally rid the cavity of any debris. Subsequently, oral mucosa cells were obtained by 30 second swabbing of the area of interest using a Fisherbrand sterilized polyester swab. In drug metabolite experiments, oral mucosa cells were collected in similar fashion, one hour after ingestion of 600 mg of Ibuprofen. All cells were immediately fixated in SurePath® fixative solution and prepared onto low-e slides in a similar fashion as described above for the clinical samples.

Data Collection

The unstained slides were interrogated by a beam of IR light that analyzes pixels of 6.25×6.25 μm$^2$ in size, from a 4.0×4.0 mm$^2$ sample spot using a PerkinElmer Spotlight 400 FTIR Imaging System, (Perkin Elmer, Shelton, Conn. USA). The instrument optical bench, the infrared microscope and an external microscope enclosure box were purged with a continuous stream of dry air (−40° C. dew point) to reduce atmospheric water vapor spectral contributions. Data were acquired using the following parameters: 4 cm$^{-1}$ spectral resolution, Norton-Beer apodization, 1 level of zero-filling, and no atmospheric background correction. Two co-added interferograms for each pixel were Fourier transformed to yield spectral vectors (or spectral pixels), each with a range of 4000-700 cm$^{-1}$ at 2 cm$^{-1}$ intervals. Background spectra for all 16 detector elements were collected using 128 co-added interferograms. Raw datasets consist of 409,600 spectra, and occupy about 2.54 GBytes each. This method of collecting spatial data in the form of infeterograms and then Fourier transforming the interferograms to produce spectral pixels is well known and is described for example in Griffiths & de Haseth, *Fourier Transform Infrared Spectrometry*, Elving, Weinefordner & Kolthoff (eds.), John Wiley & Sons, New York (1986). As an example, each interferogram can contain 8,000 data points and can correspond to a pixel sized region of the sample. A one dimensional Fourier transform can then be applied to each interforgram to generate a spectral pixel, each such spectral pixel containing for example 1,600 intensity measurements, each of the intensity measurements representing intensity at a particular wavenumber.

It will be appreciated though that the method of reconstructing cellular spectra disclosed herein may also be used with spectral pixel data that is collected by other means, e.g., without an interferometer and by for example tuning a monochromatic infrared laser or a tunable filter.

Image Processing

Reconstructed cellular spectra of the cells were then generated using the method disclosed above in connection with FIG. 2. In particular, raw data sets from the infrared microspectrometers were imported into software referred to as PapMap. This program is written in 64-bit MATLAB [The Mathworks, Natick, Mass. USA] in order to accommodate the large data matrices. PapMap reconstructs the spectra of individual cells, collected in mapping mode, from between 9 and 100 individual pixel spectra for each cell. It does so by establishing which pixel spectra belong to a given cell of the image map. This is accomplished by constructing a binary mask in which contiguous regions belonging to individual cells are identified. This mask is established by defining a threshold for the amide I intensity.

For each contiguous area occupied by a cell, the cellular spectrum is calculated, starting from the spectrum with the largest amide I intensity. This spectrum is presumably from the nucleus of the cell, which always exhibits the strongest protein intensity.

Once the binary mask associates spectra with their cells, all spectra are subsequently co-added and, subject to several constraints to ensure spectral quality. These criteria are imposed to prevent the co-addition of very weak spectra with poor signal-to-noise to contaminate the cell spectrum, such as spectra from the edges of a cell, which may be contaminated by dispersion artifact.

The co-added cellular spectra, as well as the coordinates of each cell, are then exported for further data analysis. After infrared data collection, the cells on a slide are stained using standard methods, developed by Papanicolaou, and cover-slipped for cytological follow-up.

Results and Discussion

Figure 10:
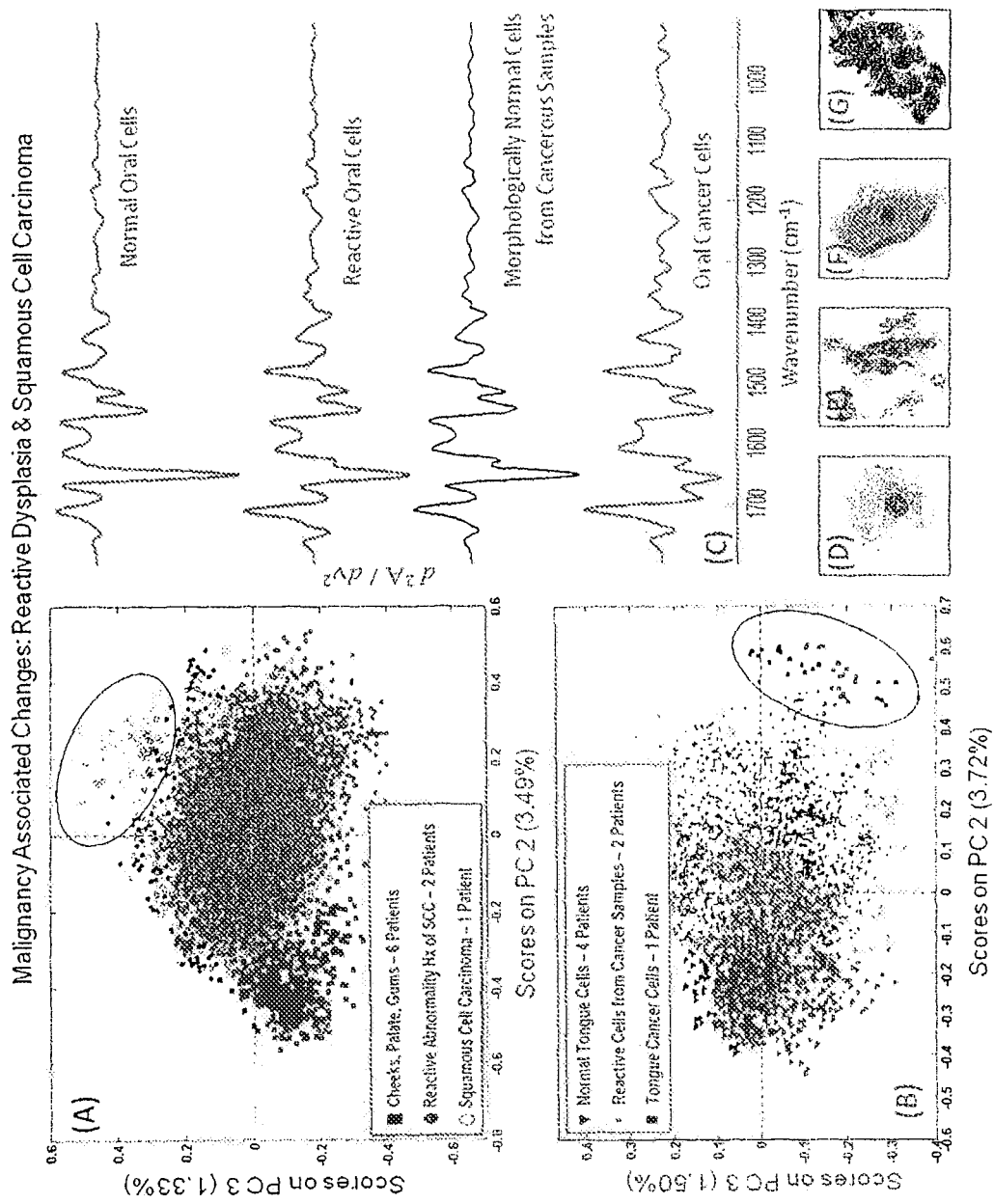
FIG. 10 illustrates discrimination between different cell types using reconstructed cellular spectra.

An example of the potential for using reconstructed cellular spectra generated according to the method discussed above in connection with FIG. 2 to accurately and reproducibly detect diseased cells at a variety of progressive states, i.e., Spectral Cytopathology or SCP, is presented in FIG. 10. In FIG. 10, the diseased cells are compared to control groups of similar origin in the oral mucosa to ensure that the spectral changes are contributed solely by disease rather than origin. The sensitivity of SCP is seen dramatically seen in FIG. 10A. Here, spectral data from the palate cells of two patients diagnosed with "reactive changes" and of one patient diagnosed with squamous cell carcinoma are plotted against spectral data from the normal palate cells of six volunteers. The two patients diagnosed with reactive changes also have a medical history of squamous cell carcinoma of the oral mucosa, so their reactive diagnosis is one deferred as their cells have some residual effects from a previous or transitioning malignancy. Though the majority of cells from the three medical samples appear morphologically normal (FIG. 10D), there is some compositional variation shared among them, which deviates from the biochemistry of normal cells (FIG. 10A). The entirety of two reactive samples cluster completely with the majority of the cancer sample (FIG. 10A). This result is expected, as the majority of most cancer samples contain reactive cells of non-cancerous morphology, while cells of cancerous morphology (FIGS. 10E and 10G) often make up the minority of samples. In fact, as few as one to three cells of cancerous morphology may be observed in a pre-malignant biopsy and they would be sufficient for a pathological diagnosis. An early cancer diagnosis, therefore, rests on the detection of few cells in a thousand, and if not detected will mean the difference between a normal and malignant diagnosis, despite the number of reactive cells.

By use of SCP, reactive cells can be analyzed, for the first time, and compared to cancerous cells for the purpose of diagnosis. Reactive cells reproducibly produce spectral patterns similar to those of diagnosed cancer samples, inferring some malignancy associated transformations. Reactive cells cluster separately from the normal cells, but together with morphologically normal cells from a cancer patient, due to a phenomenon known as "malignancy associated changes" (MACs), which can be defined as nuclear differences in normal-appearing cells from patients with present or previous carcinomas. A significant potential of SCP may be in its sensitivity to detect MACs which can correlate to compositional states initiated by pre-cancerous states. Interpretations of a biopsy no longer needs to be made on the behalf of few high-grade cells which may or may not have been prepared on the pathological slide. Instead, the sensitivity of SCP allows for pathological interpretations to be accurately and reproducibly made throughout the entire biopsy.

The ellipse drawn in FIG. 10A highlights the cells of cancerous morphology that can be diagnosed by current methods of pathology. These few cells, an example of one shown in FIG. 10E, cluster tightly and furthest away from the normal cells, registering the largest compositional variation from normal biochemistry. The implementation of SCP has blindly distinguished cells by their progression states of disease and accurately detected the minority of cells with cancerous morphology. FIG. 10A-B represent PCA scores plot of the significant spectral differences between normal oral cells and oral cells of (A) reactive and (B) cancer biopsies. FIG. 10C represents second derivative, vector normalized spectra representative of oral cells in successive states of abnormality. FIGS. 10D-E represent 40x visual images of epithelial palate cells from diagnosed (D) reactive and (E) carcinoma samples. FIGS. 10F-G represent 40x visual image of morphologically normal epithelial tongue cells and morphologically cancerous epithelial tongue cells, both from diagnosed cancer biopsies.

FIG. 10B shows a PCA plot of two samples of patients diagnosed with tongue cancer and four samples of normal tongue cells. Only a small number of cells (red squares) from the two cancerous samples can be diagnosed as cancer by current methods of cytology. In contrast, SCP finds intrinsic compositional changes which significantly vary from the normal composition of typical tongue cells (FIG. 10B). Though most of the sample is comprised of disaggregated cells (FIG. 10F) void of the morphological characteristics common to high grade cancerous cells (FIG. 10G), the entire sample produces spectral patterns contributed by disease state (FIG. 3B). The asterisks, representative of cells from the cancerous samples that are not diagnosable by standard pathology, have some biochemical changes reproducible in the spectra, which SCP is sensitive enough to detect. Again, the compositional changes seen in the asterisks may be a result of MACs. FIG. 10B shows the successful detection of cells transitioning from normal state to reactive or pre-cancerous state, and continuing to low grade and high grades of carcinoma of the tongue. Results here are correlated to those in FIG. 10A of the palate.

FIG. 10C depicts a stack plot of the averaged second derivate, normalized spectra representative of samples in states ranging from normal to disease. There is a significant inverse trend in intensities of the Amide I and phosphate bands (the vibrations of the phosphodiester group, —O—$(PO_2)^-$—O—, at 1080 and 1230 $cm^{-1}$, are referred to as the "phosphate bands", in accordance with general biochemical nomenclature). As disease progresses, the Amide I decreases in intensity as the phosphate bands increase. This Amide I trend may be associated with the degradation of common proteins and the expression of different proteins as cells respond to the disease. Conversely, phosphate band intensities increase as cancerous cells have increased rates of replication. In addition, the formation of new proteins as disease progresses is indicated by a low frequency shoulder of the Amide I band at 1618 $cm^{-1}$, which is reproducible in spectra of diseased cells. Furthermore, the average second derivate, normalized spectrum of reactive cells and that of cancerous cells of normal morphology are virtually identical, supporting SCP's potential for detecting malignancy associated changes throughout the entire biopsy.

The reconstructed cellular spectra shown in FIG. 10C are slightly different than spectra shown in other drawings herein. Specifically, the spectra shown in FIG. 10C are the second derivative of intensity with respect to wavenumber (i.e., $d^2I/dv^2$, where I represents intensity, or absorbance, of the reconstructed spectra and where v represents wavenumber).

Example 5

Figure 11:
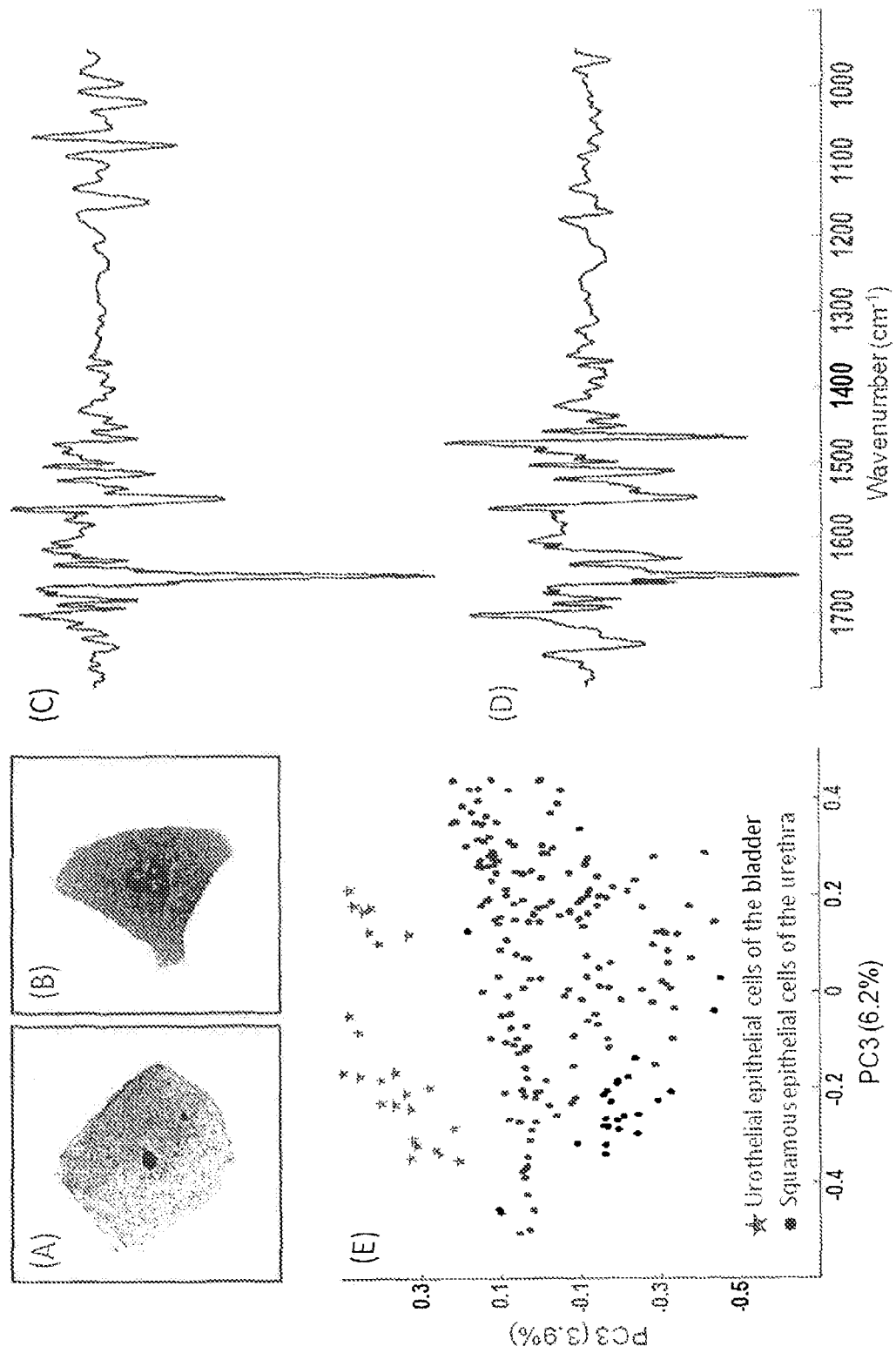
FIG. 11 illustrates another example of discrimination between different cell types using reconstructed cellular spectra.

FIG. 11 shows another example of how reconstructed cellular spectra generated according to the method disclosed herein can be used to discriminate between different types of cells. Panel A of FIG. 11 shows a squamous epithelial cell of the urethra. Panel B of FIG. 11 shows a urothelial epithelial cell of the bladder. Panel C of FIG. 11 shows the 2nd derivative with respect to wavenumber of the reconstructed spectra for the cell shown in panel A. Similarly, panel D of FIG. 11 shows the $2^{nd}$ derivative with respect to wavenumber of the reconstructed spectra of the cell shown in panel B. Panel E shows the PCA scores plot of multiple cells of the types shown in panels A and B, the scores for urethra cells being shown as black circles and the scores for bladder cells being shown as gray stars. As shown, the two types of cells for distinct clusters in the plot shown in panel E, with the urethra cells being readily distinguishable from the bladder cells.

Equivalents

The spectral cyto-pathological method of the present invention and many of its attendant advantages will be understood from the foregoing description and it will be apparent that various changes may be made without departing from the spirit and scope of the invention or sacrificing all of its material advantages, the form hereinbefore described being merely an exemplary embodiment thereof.

We claim:
1. A method of generating a spectrum of a cell, the method comprising:
   (a) receiving a plurality of spectral pixels, each of the spectral pixels corresponding to a portion of the cell, each of the spectral pixels being associated with a plurality of measurements, each of the measurements being associated with an intensity of light at a particular wavenumber, one of the measurements associated with each spectral pixel being a sorting measurement, the sorting measurement being associated with a wavenumber within a band of wavenumbers;
   (b) identifying a subset of the plurality of the spectral pixels, a first pixel being in the subset, the sorting measurement of the first pixel being greater than or equal to the sorting measurements of the other spectral pixels, other pixels in the plurality of spectral pixels being in the subset if they satisfy a first criteria, a spectral pixel satisfying the first criteria if that spectral pixel's sorting measurement is greater than a first threshold;
   (c) generating a spectrum, the spectrum having a plurality of reconstructed measurements, each of the reconstructed measurements corresponding to a particular wavenumber, each of the reconstructed measurements being formed according to a sum of the measurements associated with a particular wavenumber of all the pixels in the subset.

2. The method according to claim 1, the first threshold being a preselected percentage of the first pixel's sorting measurement.

3. The method according to claim 2, the band of wavenumbers having a lower end and an upper end, the lower and upper ends being user selectable values.

4. The method according to claim 3, the lower end being 1640 $cm^{-1}$ and the upper end being 1670 $cm^{-1}$.

5. The method according to claim 3, the sorting measurement for each spectral pixel being a peak value of that spectral pixel's associated measurements, the peak value being a peak that is closest to a user selectable wavenumber.

6. The method according to claim 5, the user selectable wavenumber being 1650 $cm^{-1}$.

7. The method according to claim 5, pixels in the plurality of spectral pixels being in the subset only if they satisfy both the first criteria and a second criteria, a pixel satisfying the second criteria if a difference between the wavenumber associated with the second pixel's sorting measurement and the wavenumber associated with the first pixel's sorting measurement is less than a second threshold.

8. The method according to claim 7, the second threshold being a user selectable number.

9. The method according to claim 8, the user selectable number being 4 $cm^{-1}$.

10. The method according to claim 1, the measurements associated with each spectral pixel representing values derived from light intensity measurements.

11. A method of analyzing the physiological state of a test cell, the method comprising:
   (a) generating a spectrum of the test cell, the method comprising:
      (i) receiving a plurality of spectral pixels, each of the spectral pixels corresponding to a portion of the cell, each of the spectral pixels being associated with a plurality of measurements, each of the measurements being associated with an intensity of light at a particular wavenumber, one of the measurements associated with each spectral pixel being a sorting measurement, the sorting measurement being associated with a wavenumber within a band of wavenumbers;

(ii) identifying a subset of the plurality of the spectral pixels, a first pixel being in the subset, the sorting measurement of the first pixel being greater than or equal to the sorting measurements of the other spectral pixels, other pixels in the plurality of spectral pixels being in the subset if they satisfy a first criteria, a spectral pixel satisfying the first criteria if that spectral pixel's sorting measurement is greater than a first threshold;

(iii) generating the spectrum, the spectrum having a plurality of reconstructed measurements, each of the reconstructed measurements corresponding to a particular wavenumber, each of the reconstructed measurements being formed according to a sum of the measurements associated with a particular wavenumber of all the pixels in the subset; and (b) determining whether the reconstructed spectrum of the test call has a predetermined criterion, the predetermined criterion being indicative of the physiological state of the test cell.

12. The method of claim 11, wherein the predetermined criterion is generated from abnormal control epithelial cell spectra or from normal control epithelial cell spectra.

13. The method of claim 12, wherein the epithelial cells in the test and control samples are endothelial, mesothelial or urothelial cells.

14. A method of detecting an epithelial cell disorder in a test cell, the method comprising:

(a) generating a spectrum of a test cell, the method comprising:

(i) receiving a plurality of spectral pixels, each of the spectral pixels corresponding to a portion of the cell, each of the spectral pixels being associated with a plurality of measurements, each of the measurements being associated with an intensity of light at a particular wavenumber, one of the measurements associated with each spectral pixel being a sorting measurement, the sorting measurement being associated with a wavenumber within a band of wavenumbers;

(ii) identifying a subset of the plurality of the spectral pixels, a first pixel being in the subset, the sorting measurement of the first pixel being greater than or equal to the sorting measurements of the other spectral pixels, other pixels in the plurality of spectral pixels being in the subset if they satisfy a first criteria, a spectral pixel satisfying the first criteria if that spectral pixel's sorting measurement is greater than a first threshold;

(iii) generating the spectrum, the spectrum having a plurality of reconstructed measurements, each of the reconstructed measurements corresponding to a particular wavenumber, each of the reconstructed measurements being formed according to a sum of the measurements associated with a particular wavenumber of all the pixels in the subset; and (b) determining whether the generated spectrum of the test cell has a predetermined criterion, the predetermined criterion being indicative of the presence of a disorder in the test cell.

15. The method of claim 14, wherein the predetermined criterion is generated from abnormal control epithelial cell spectra.

16. The method of claim 14, wherein the epithelial cells in the test and control samples are endothelial, mesothelial or urothelial cells.

17. The method of claim 14, wherein the epithelial cell disorder is a benign disorder, a viral disorder, pre-cancer or cancer.

18. A method analyzing a cell in a sample, the method comprising:

(a) generating a spectrum of a test cell, the method comprising:

(i) receiving a plurality of spectral pixels, each of the spectral pixels corresponding to a portion of the cell, each of the spectral pixels being associated with a plurality of measurements, each of the measurements being associated with an intensity of light at a particular wavenumber, one of the measurements associated with each spectral pixel being a sorting measurement, the sorting measurement being associated with a wavenumber within a band of wavenumbers;

(ii) identifying a subset of the plurality of the spectral pixels, a first pixel being in the subset, the sorting measurement of the first pixel being greater than or equal to the sorting measurements of the other spectral pixels, other pixels in the plurality of spectral pixels being in the subset if they satisfy a first criteria, a spectral pixel satisfying the first criteria if that spectral pixel's sorting measurement is greater than a first threshold;

(iii) generating the spectrum, the spectrum having a plurality of reconstructed measurements, each of the reconstructed measurements corresponding to a particular wavenumber, each of the reconstructed measurements being formed according to a sum of the measurements associated with a particular wavenumber of all the pixels in the subset;

(b) determining whether the generated spectrum of the test cell has a predetermined criterion, the predetermined criterion being indicative of the presence of a disorder in the test cell; and (c) forming a reconstructed cellular spectrum, the reconstructed cellular spectrum having a plurality of reconstructed intensities, each of the reconstructed intensities corresponding to a particular wavenumber, each of the reconstructed intensities being formed according to a sum of the intensity measurements at a particular wavenumber of the pixels in the subset.

* * * * *

UNITED STATES PATENT AND TRADEMARK OFFICE
CERTIFICATE OF CORRECTION

PATENT NO.        : 8,428,320 B2                                     Page 1 of 1
APPLICATION NO.   : 12/994647
DATED             : April 23, 2013
INVENTOR(S)       : Diem et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 329 days.

Signed and Sealed this
Eighth Day of September, 2015

Michelle K. Lee
*Director of the United States Patent and Trademark Office*